United States Patent
Zhao et al.

(10) Patent No.: US 9,491,660 B2
(45) Date of Patent: Nov. 8, 2016

(54) SUPPORT DATA CONNECTIVITY OVER WLAN AND WWAN

(71) Applicant: QUALCOMM Incorporated, San Diego, CA (US)

(72) Inventors: Suli Zhao, San Diego, CA (US); Srinivasan Balasubramanian, San Diego, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 14/268,742

(22) Filed: May 2, 2014

(65) Prior Publication Data

US 2014/0328177 A1  Nov. 6, 2014

Related U.S. Application Data

(60) Provisional application No. 61/820,047, filed on May 6, 2013.

(51) Int. Cl.
*H04W 4/00* (2009.01)
*H04W 28/08* (2009.01)
(Continued)

(52) U.S. Cl.
CPC ......... *H04W 28/08* (2013.01); *H04W 36/0027* (2013.01); *H04W 76/026* (2013.01); *H04W 84/04* (2013.01); *H04W 84/12* (2013.01); *H04W 88/06* (2013.01)

(58) Field of Classification Search
CPC .............................. H04W 28/08; H04W 76/02
USPC ........................................................ 370/235
See application file for complete search history.

(56) References Cited

U.S. PATENT DOCUMENTS

| 2012/0023189 A1* | 1/2012 | Giaretta | H04W 48/18 709/217 |
| 2013/0028172 A1* | 1/2013 | Lim | H04W 36/12 370/315 |

(Continued)

FOREIGN PATENT DOCUMENTS

| WO | WO-2012147270 A1 | 11/2012 |
| WO | WO 2013 022220 A1 | 2/2013 |
| WO | WO-2013042330 A1 | 3/2013 |

OTHER PUBLICATIONS

ISA/EPO, International Search Report and Written Opinion of the International Searching Authority, Int'l App. No. PCT/US2014/036781, Sep. 12, 2014, European Patent Office, Rijswijk, NL, 17 pgs.

(Continued)

*Primary Examiner* — Farah Faroul
(74) *Attorney, Agent, or Firm* — Holland & Hart LLP

(57) ABSTRACT

Methods, systems, and devices are described for managing data connectivity at a user equipment (UE). The managing may include determining that all traffic of all PDN connections of the UE is currently offloaded to a Wireless Local Area Network (WLAN) access network and then refraining from transmitting and receiving data over Wireless Wide Area Network (WWAN) PDN connections while all traffic of all PDN connections of the UE is offloaded to the WLAN access network. In response to detecting a triggering event, a PDN connection may be established with at least one of an available WWAN access network or the WLAN access network, according to a current WWAN camping status of the UE and a WLAN offload policy.

28 Claims, 23 Drawing Sheets

(51) Int. Cl.
 *H04W 36/00* (2009.01)
 *H04W 76/02* (2009.01)
 *H04W 88/06* (2009.01)
 *H04W 84/04* (2009.01)
 *H04W 84/12* (2009.01)

(56) References Cited

U.S. PATENT DOCUMENTS

| | | |
|---|---|---|
| 2014/0050086 A1 | 2/2014 | Himayat et al. |
| 2014/0064068 A1 | 3/2014 | Horn et al. |
| 2014/0254576 A1* | 9/2014 | Varma ............... H04W 48/16 370/338 |

OTHER PUBLICATIONS

Qualcomm, "On Moving PDN Connections to a Non-3GPP Access (e.g. WLAN) and Retaining Voice/SMS Services," SA WG2 Temporary Document, SA WG2 Meeting #96, Apr. 8-12, 2013, San Diego, California, US, S2-131089 (revision of S2-13xxxx), 3GPP, downloaded from http://www.3gpp.org/ftp/tsg_sa/WG2_Arch/TSGS2_96_San_Diego/Docs/, 3 pgs.

Safdar, et al. "Fuzzy Logic Based Vertical Handover Algorithm Between LTE and WLAN", International Conference on Intelligent and Advanced Systems (ICIAS), 2010, 4 pages.

* cited by examiner

SUPPORT DATA CONNECTIVITY OVER WLAN AND WWAN

CROSS REFERENCES

The present application for patent claims priority to U.S. Provisional Patent Application No. 61/820,047 by Zhao et al., entitled "Support Data Connectivity Over WLAN and WWAN filed May 6, 2013, assigned to the assignee hereof, and expressly incorporated by reference herein.

BACKGROUND

The following relates generally to wireless communication, and more specifically to the management of data connectivity at a user equipment (UE) operating within a wireless communications system. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of access points, each simultaneously supporting communication for multiple UEs. Different access points may in some cases be associated with different access networks, including Wireless Wide Area Network (WWAN) access networks or Wireless Local Area Network (WLAN) access networks. In some cases, it may be desirable to limit a UE's data connectivity to one or more of the WLAN access networks to comply with a carrier policy. However, such carrier policies may at times conflict with one or more policies at the UE which may favor WWAN for certain types of communications. For example, a carrier policy may favor the offloading of packet data network (PDN) connections from a WWAN access network to a WLAN access network when the UE is within range of the WLAN access network. But the UE may also enforce a competing policy which specifies WWAN as a default provider for access to one or more PDNs or PDN types. Therefore, there is a need to determine the behavior of a UE when the PDN connections of the UE have been offloaded to WLAN while avoiding conflicts between competing carrier and UE WWAN policies.

SUMMARY

The described features generally relate to one or more improved methods, systems, and/or apparatuses for managing data connectivity at a user equipment (UE). The managing may include determining that all traffic of all PDN connections of the UE is currently offloaded to a Wireless Local Area Network (WLAN) access network, and then refraining from transmitting and receiving data over Wireless Wide Area Network (WWAN) PDN connections while all traffic of all PDN connections of the UE is offloaded to the WLAN access network. In response to detecting a triggering event, a PDN connection may be established with at least one of an available WWAN access network or the WLAN access network, according to a current WWAN camping status of the UE and a WLAN offload policy.

According to a first illustrative configuration, a method of managing data connectivity at a user equipment (UE) may include determining that all traffic of all PDN connections of the UE is currently offloaded to a Wireless Local Area Network (WLAN) access network; refraining from transmitting and receiving data over Wireless Wide Area Network (WWAN) PDN connections while all traffic of all PDN connections of the UE is offloaded to the WLAN access network; detecting a triggering event; and establishing a PDN connection with at least one of an available WWAN access network or the WLAN access network in response to the triggering event according to a current WWAN camping status of the UE and a WLAN offload policy.

In certain examples, refraining from transmitting and receiving data over the WWAN PDN connections may include at least one of placing the UE in an LTE limited service mode or disabling LTE functionality at the UE. In certain examples, the UE may identify an LTE access network available to the UE and a non-LTE WWAN access network available to the UE, and camp on the non-LTE WWAN access network while refraining from transmitting and receiving data over WWAN PDN connections.

The UE may, in certain examples, determine that an only WWAN access network currently available to the UE is an LTE access network, and camp on the LTE access network while refraining from transmitting and receiving data over WWAN PDN connections. In certain examples, the UE may receive system information block messages from an LTE access network while refraining from transmitting and receiving data over WWAN PDN connections.

In certain examples, the triggering event may include a determination to transfer an existing PDN connection from the WLAN access network to the available WWAN access network. In certain examples, a determination may be made that the UE is camped on an evolved packet core (EPC)-capable non-LTE WWAN access network while refraining from transmitting and receiving data over WWAN PDN connections. The UE may transfer the existing PDN connection of the UE to the EPC-capable non-LTE WWAN access network in response to the triggering event and perform, in response to the triggering event, at least one of: enabling LTE functionality or placing the UE in an LTE normal mode. The existing PDN connection of the UE may then be transferred from the EPC-capable non-LTE WWAN access network to an LTE access network in response to the UE attaching to the LTE access network or entering the LTE normal mode.

In certain examples, a determination may be made that the UE is camped on an LTE access network in a limited service mode while refraining from transmitting and receiving data over WWAN PDN connections or that the UE has disabled LTE functionality and is not camping on any WWAN access network while refraining from transmitting and receiving data over WWAN PDN connections. In these examples, the UE may perform, in response to the triggering event, at least one of: enabling LTE functionality or placing the UE in an LTE normal mode, and then transfer the existing PDN connection of the UE from the WLAN access network to the LTE access network in response to the UE attaching to the LTE access network or entering the LTE normal mode.

In certain examples, the triggering event may include receiving an application request at the UE to establish a new PDN connection which is supported by only WWAN access networks.

According to a set of examples, the UE may determine that the UE is camped on an evolved packet core (EPC)-capable non-LTE WWAN access network while refraining from transmitting and receiving data over WWAN PDN connections; establish a new PDN connection at the EPC-capable non-LTE WWAN access network in response to the triggering event; perform, in response to the triggering event, at least one of: enabling LTE functionality or placing the UE in an LTE normal mode; and transfer the new PDN connection of the UE from the EPC-capable non-LTE WWAN access network to an LTE access network in response to the UE attaching to the LTE access network or entering the LTE normal mode.

In certain examples, a determination may be made that the UE is camped on an LTE access network in a limited service mode while refraining from transmitting and receiving data over WWAN PDN connections; the UE may be placed in an LTE normal mode in response to the triggering event; and a new PDN connection may be established at the LTE access network in response to the UE entering the LTE normal mode.

In still other examples, a determination may be made that the UE is not camping on any WWAN access network while refraining from transmitting and receiving data over WWAN PDN connections; the UE may perform, in response to the triggering event, at least one of: enabling LTE functionality at the UE or placing the UE in an LTE normal mode; and a new PDN connection may be established at an LTE access network in response to the UE attaching to the LTE access network within a threshold amount of time.

In certain examples, the UE may return a failure to an application that made the application request in response to a determination that the UE has not attached to the LTE access network within the threshold amount of time, and perform, in response to the determination that the UE has not attached to the LTE access network within the threshold amount of time, at least one of: disabling LTE functionality or placing the UE in an LTE limited service mode.

In certain examples, the triggering event may include an application request to establish a new PDN connection for which WWAN has a higher priority than WLAN.

The UE may, for example, determine that the UE is camped on an evolved packet core (EPC)-capable non-LTE WWAN access network while refraining from transmitting and receiving data over WWAN PDN connections, establish the new PDN connection at the EPC-capable non-LTE WWAN access network in response to the triggering event; perform, in response to the triggering event, at least one of: enabling LTE functionality or placing the UE in an LTE normal mode; and transfer the new PDN connection of the UE from the EPC-capable non-LTE WWAN access network to an LTE access network in response to the UE attaching to the LTE access network or entering the LTE normal mode.

Additionally or alternatively, the UE may determine that the UE is camped on an LTE access network in a limited service mode while refraining from transmitting and receiving data over WWAN PDN connections; place the UE in an LTE normal mode in response to the triggering event; and establish the new PDN connection at the LTE access network in response to the UE entering the LTE normal mode.

In additional or alternative examples, the UE may determine that the UE is not camping on any WWAN access network while refraining from transmitting and receiving data over WWAN PDN connections; perform, in response to the triggering event, at least one of: enabling LTE functionality or placing the UE in an LTE normal mode; establish the new PDN connection at the WLAN access network in response to the triggering event; and transfer the new PDN connection of the UE from the WLAN access network to an LTE access network in response to the UE attaching to the LTE access network.

According to a second illustrative configuration, a user equipment (UE) may include means for determining that all traffic of all PDN connections of the UE is currently offloaded to a Wireless Local Area Network (WLAN) access network; means for refraining from transmitting and receiving data over Wireless Wide Area Network (WWAN) PDN connections while all traffic of all PDN connections of the UE is offloaded to the WLAN access network; means for detecting a triggering event; and means for establishing a PDN connection with at least one of an available WWAN access network or the WLAN access network in response to the triggering event according to a current WWAN camping status of the UE and a WLAN offload policy.

In certain examples, the UE of the second illustrative configuration may be configured to implement one or more aspects of the functionality described above with reference to the method of the first illustrative configuration.

According to a third illustrative configuration, an apparatus for wireless communication may include at least one processor configured to determine that all traffic of all PDN connections of the UE is currently offloaded to a Wireless Local Area Network (WLAN) access network; refrain from transmitting and receiving data over Wireless Wide Area Network (WWAN) PDN connections while all traffic of all PDN connections of the UE is offloaded to the WLAN access network; and detect a triggering event. The at least one processor may be further configured to establish a PDN connection with at least one of an available WWAN access network or the WLAN access network in response to the triggering event according to a current WWAN camping status of the UE and a WLAN offload policy.

In certain examples, the at least one processor of the apparatus for wireless communication of the third illustrative configuration may be configured to implement one or more aspects of the functionality described above with reference to the method of the first illustrative configuration.

According to a fourth illustrative configuration, a computer program product may include a non-transitory computer-readable medium having computer-readable program code stored thereon. The computer-readable program code may include computer-readable program code configured to cause at least one processor to determine that all traffic of all PDN connections of the UE is currently offloaded to a Wireless Local Area Network (WLAN) access network; computer-readable program code configured to cause the at least one processor to refrain from transmitting and receiving data over Wireless Wide Area Network (WWAN) PDN connections while all traffic of all PDN connections of the UE is offloaded to the WLAN access network; computer-readable program code configured to cause the at least one processor to detecting a triggering event; and computer-readable program code configured to cause the at least one processor to establish a PDN connection with at least one of an available WWAN access network or the WLAN access network in response to the triggering event according to a current WWAN camping status of the UE and a WLAN offload policy.

In certain examples, the computer program product of the fourth illustrative configuration may be configured to implement one or more aspects of the functionality described above with reference to the method of the first illustrative configuration.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
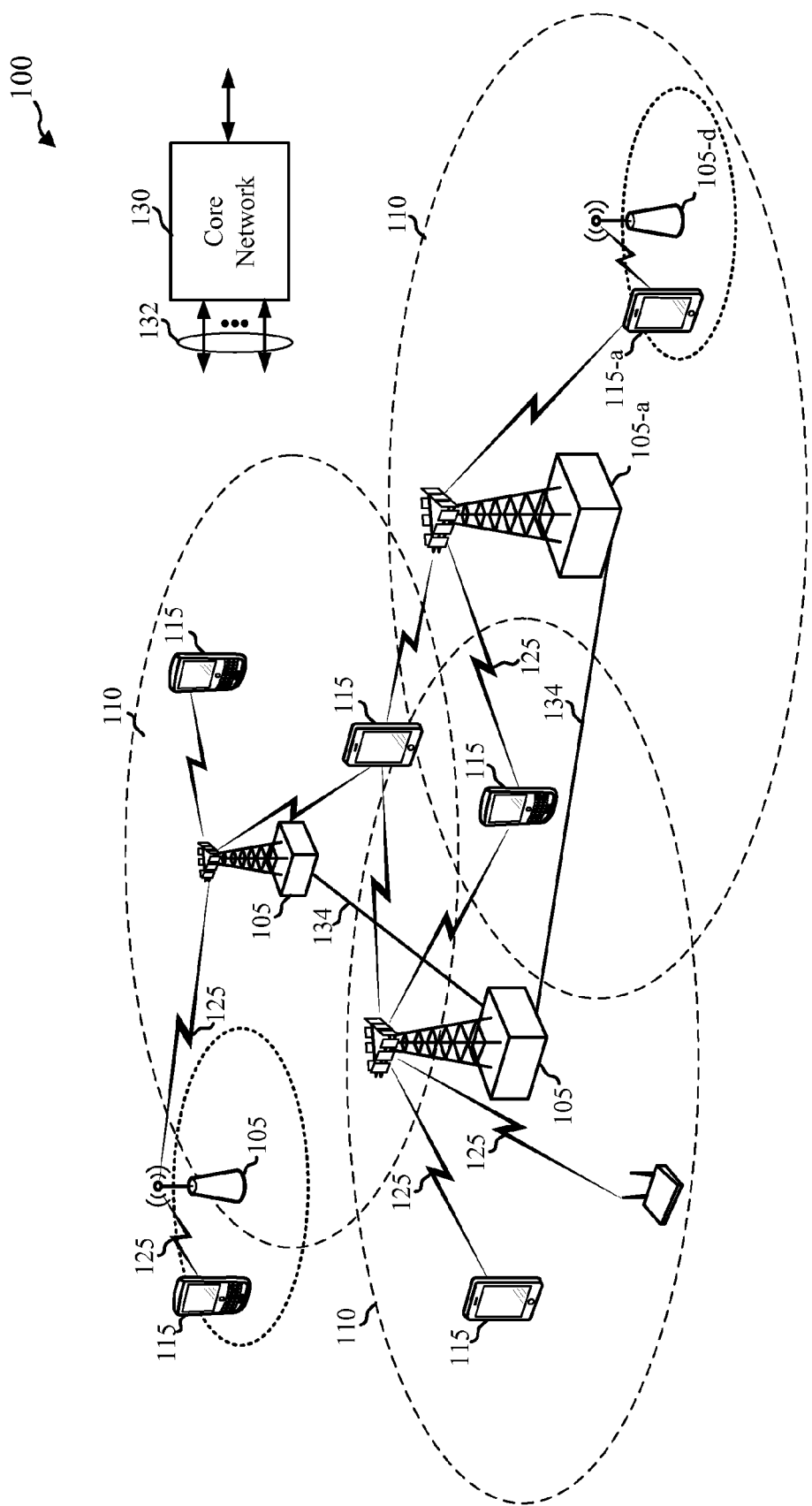
FIG. 1 shows a first block diagram of a wireless communications system.

Management of data connectivity at a user equipment (UE) operating within a wireless communications system is described. In some situations, a network operator or other entity may desire that a UE provides data connectivity over a Wireless Local Area Network (WLAN) only. In these scenarios, the traffic of the UE's Packet Data Network (PDN) connections may be offloaded from one or more Wireless Wide Area Network (WWAN) access networks to one or more WLAN access networks. Thereafter, the UE may not attempt to transmit or receive data over WWAN PDN connections, or the desired result of providing the UE's data connectivity over WLAN only is not achieved. Certain triggering events, however, may lead to the reestablishment or use of a PDN connection with a WWAN access network. These triggering events may include, for example, a determination to transfer an existing PDN connection from the WLAN access network to the available WWAN access network (e.g., because WLAN access has deteriorated to an unacceptable level; because an application requests that a handover of an existing PDN connection be made to WWAN; or because the UE's access network management module determines that WWAN is preferred over WLAN because, for example, the condition of a Radio Access Technology (RAT) changes), or a request received at the UE to establish a new data connection supported by only WWAN access networks, or an application request to establish a new PDN connection for which WWAN has a higher priority than WLAN.

In the disclosed wireless communications network, the UE may communicate with a LTE access network either via an LTE-PDN connection or LTE-NSWO-PDN connection that is subject to the NSWO policy. In the case when the UE is originally attached to an LTE access network via an LTE-PDN connection, the UE may disconnect from the LTE access network or enter an LTE limited service mode with the LTE access network after all traffic of all PDN connections is offloaded to the WLAN access network. Alternately, if a last PDN connection with the LTE access network is a PDN connection subject to non-seamless WLAN offload (NSWO), the UE may maintain the PDN connection and refrain from transmitting and receiving data over the PDN connection. When the UE is originally attached to a WWAN access network using a non-EPC-capable technology, the preceding operations may be performed when the UE acquires service over an LTE access network.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, etc. IS-856 (TIA-856) is commonly referred to as CDMA2000 1xEV-DO, High Rate Packet Data (HRPD) evolved HRPD (eHRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various examples. Some of the access points 105 may communicate control information and/or user data with the core network 130 through backhaul links 132. In some examples, some of the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective geographic coverage area 110. In some examples, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, or some other suitable terminology. The coverage area 110 for an access point may be divided into sectors making up only a portion of the coverage area (not shown). The wireless communications system 100 may include access points 105 of different types (e.g., macro, micro, and/or pico base stations). The access points 105 may also utilize different radio technologies. The access points 105 may be associated with the same or different access networks. The coverage areas of different access points 105, including the coverage areas of the same or different types of access points 105, utilizing the same or different radio technologies, and/or belonging to the same or different access networks, may overlap.

In some examples, the wireless communications system 100 may be or include an LTE/LTE-A communications system (or network). In LTE/LTE-A communications systems, the term evolved Node B (eNB) may be generally used to describe the access points 105. The wireless communications system 100 may also be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the access points 105 via a backhaul link 132 (e.g., S1, etc.). The access points 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the access points may have similar frame timing, and transmissions from different access points may be approximately aligned in time. For asynchronous operation, the access points may have different frame timing, and transmissions from different access points may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a handheld device, a tablet computer, a laptop computer, a cordless phone, a wireless local loop (WLL) station, or the like. A UE may be able to communicate with macro eNBs, pico eNBs, femto eNBs, relays, and the like. A UE may also be able to communicate over different access networks, such as cellular or other WWAN access networks, or WLAN access networks.

The communication links 125 shown in wireless communications system 100 may include uplinks for carrying uplink (UL) transmissions (e.g., from a UE 115 to an access point 105) and/or downlinks for carrying downlink (DL) transmissions (e.g., from an access point 105 to a UE 115). The UL transmissions may also be called reverse link transmissions, while the DL transmissions may also be called forward link transmissions.

As shown, a UE 115-a may simultaneously or alternately communicate with more than one access point 105-a, 105-d. For example, in some cases, a UE 115-a may simultaneously communicate with an access point or eNB 105-a of an LTE access network (i.e., a form of WWAN access network) and a WLAN access point (AP) 105-d of a WLAN access network. In some embodiments, a UE 115 such as the UE 115-a may manage data connectivity at the UE 115-a by determining that all traffic of all PDN connections of the UE is currently offloaded to a Wireless Local Area Network (WLAN) access network (e.g., to the WLAN AP 105-d), and refraining from transmitting and receiving data over WWAN PDN connections (e.g., PDN connections with the eNB 105-a) while all of the traffic of all of the PDN connections of the UE 115-a is offloaded to the WLAN access network. Then, in response to detecting a triggering event, and according to a current WWAN camping status of the UE 115-a and a WLAN offload policy, the UE 115-a may establish a PDN connection with at least one of an available WWAN access network or the WLAN access network. The management of data connectivity at a UE 115 is described in further detail below.

Figure 2:
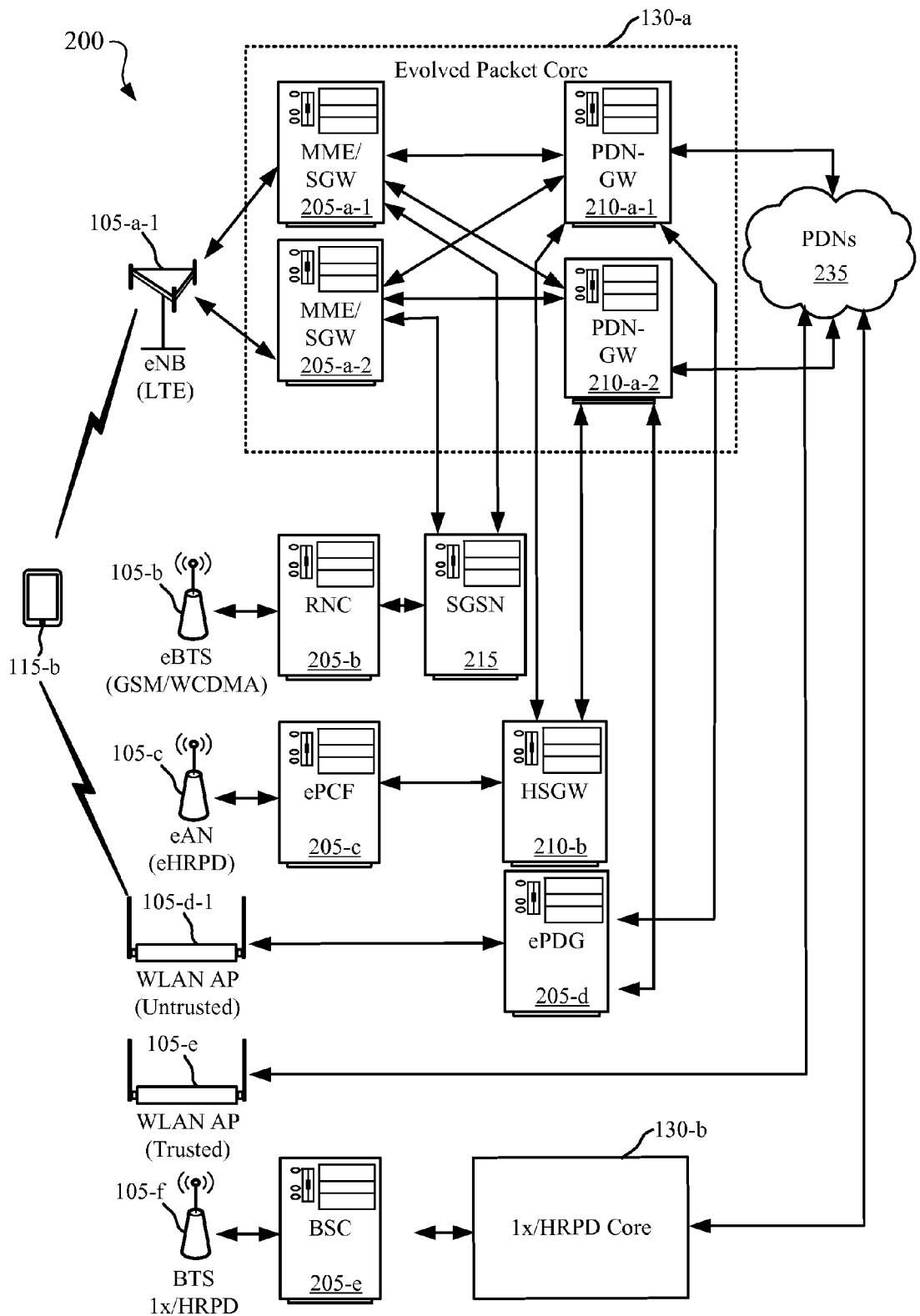
FIG. 2 shows a second block diagram of a wireless communications system.

Referring now to FIG. 2, there is shown a wireless communications system 200. The wireless communications system 200 includes a UE 115-b, an enhanced packet core (EPC) 130-a, a 1x/HRPD packet core 130-b, as well as a number of access points 105, a number of controllers 205, a number of gateways 210, and a number of PDNs 235. The access points 105 may include an eNB 105-a-1 associated with an LTE access network, an enhanced Base Transceiver Station (eBTS) 105-b associated with a GSM or WCDMA access network, an evolved Access Node (eAN) 105-c associated with an eHRPD access network, a WLAN access point 105-d-1 associated with an untrusted WLAN access network, a WLAN access point 105-e associated with a trusted WLAN access network, and a Base Transceiver Station (BTS) 105-f associated with a 1x/HRPD or 1x only access network.

The enhanced packet core 130-a may include a number of devices 205-a implementing Mobile Management Entities (MMEs) and Serving Gateways (SGWs). Alternatively, one or more of the MMEs and SGWs may be implemented in separate devices. The SGWs may in turn be in communication with one or more Packet Data Network Gateways (PDN-GWs) 210-a-1, 210-a-2. Each of the PDN-GWs 210-a-1, 210-a-2 may be in communication with one or more PDNs 235.

The eNB 105-a-1 may access the EPC 130-a through a direct connection to the MME/SGW devices 205-a. The eBTS 105-b may be in communication with a Radio Network Controller (RNC) 205-b, which in turn may communicate with a Serving GPRS Support Node (SGSN) 215 to access the EPC 130-a through MME/SGs 205-a. The eAN 105-c may be in communication with an evolved Packet Control Function (ePCF) 205-c, which may communicate with a HRPD Serving Gateway (HSGW) 210-b to access the EPC 130-a through PDN-GWs 210-a. The untrusted WLAN access point 105-d-1 may communicate with an evolved Packet Data Gateway (ePDG) 205-d, which may provide access to the EPC 130-a through the PDN-GWs 210-a. The trusted WLAN AP 105-e may bypass the EPC 130-a and may communicate directly with the PDNs 235. The BTS 105-f may be in communication with a BSC 205-e, which may be in communication with a core network 130-b (e.g., a 1x/HRPD core network). The core network 130-b may be in communication with one or more of the PDNs 235.

Each of the eNB 105-a-1, eBTS 105-b, eAN 105-c, and BTS 105-f may provide access to a WWAN access network, whereas each of the WLAN APs 105-d-1, 105-e may provide access to a WLAN access network. The eNB 105-a-1 may provide access to an LTE (WWAN) access network, whereas the eBTS 105-b, eAN 105-c, and BTS 105-f may provide access to non-LTE WWAN access networks. The eNB 105-a-1, eBTS 105-b, and eAN 105-c may provide access to EPC-capable WWAN access networks, whereas the BTS 105-f may provide access to a non-EPC-capable WWAN access network.

In some embodiments, a UE 115 such as the UE 115-b may establish PDN connections with more than one of the eNB 105-a-1, eBTS 105-b, eAN 105-c, WLAN AP 105-d-1, WLAN AP 105-e, BTS 105-f, and/or other access points 105 (e.g., the UE 115-b may support multi-access PDN connectivity (MAPCON)). PDN connections over different access networks may be established using different Access Point Names (APNs). In some embodiments, a UE 115 may establish or maintain PDN connections with more than one access point simultaneously.

A UE 115 such as the UE 115-b may have preferences for accessing access networks to establish data connectivity. The preferences may be based on network operator policies. Using the preferences, the UE 115-b may establish data connectivity over a most preferred available system and maintain data connectivity continuity.

Figure 3A:
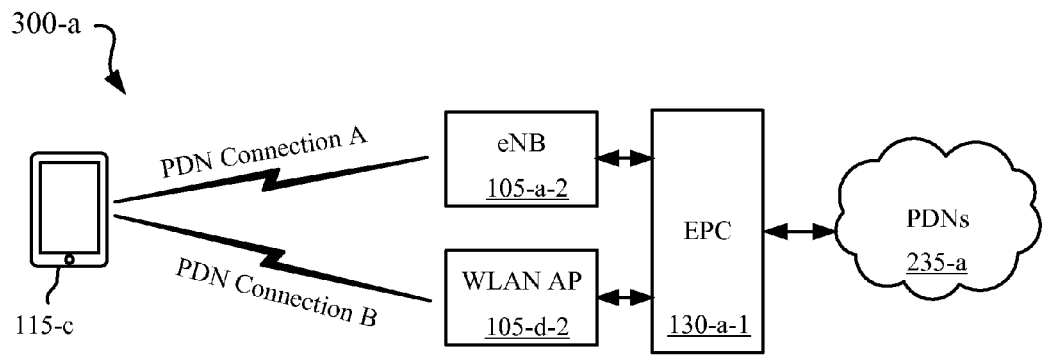
FIGS. 3A, 3B, and 3C illustrate an example of offloading all traffic of all PDN connections of a UE from an LTE access network and then disconnecting from the LTE access network, in accordance with various embodiments.
Figure 3B:
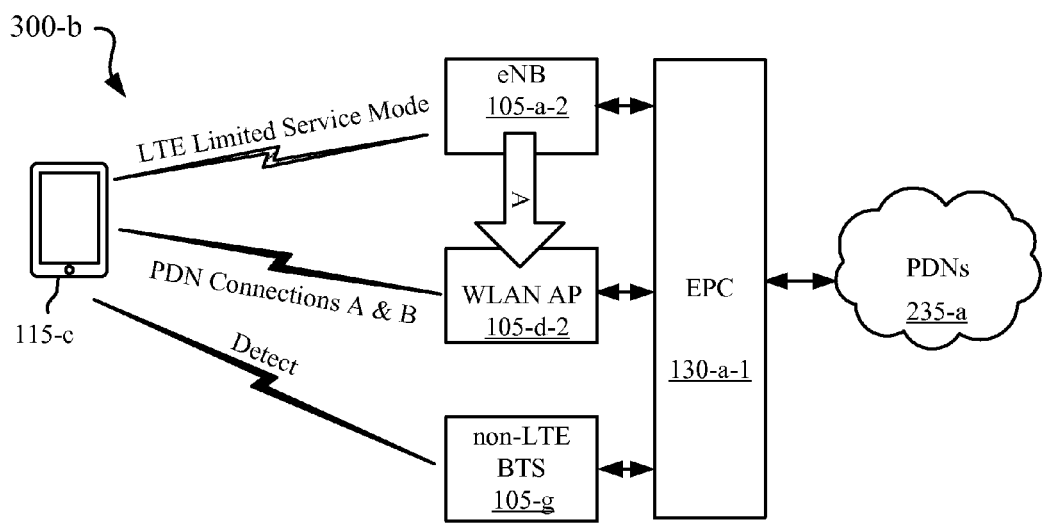
Figure 3C:
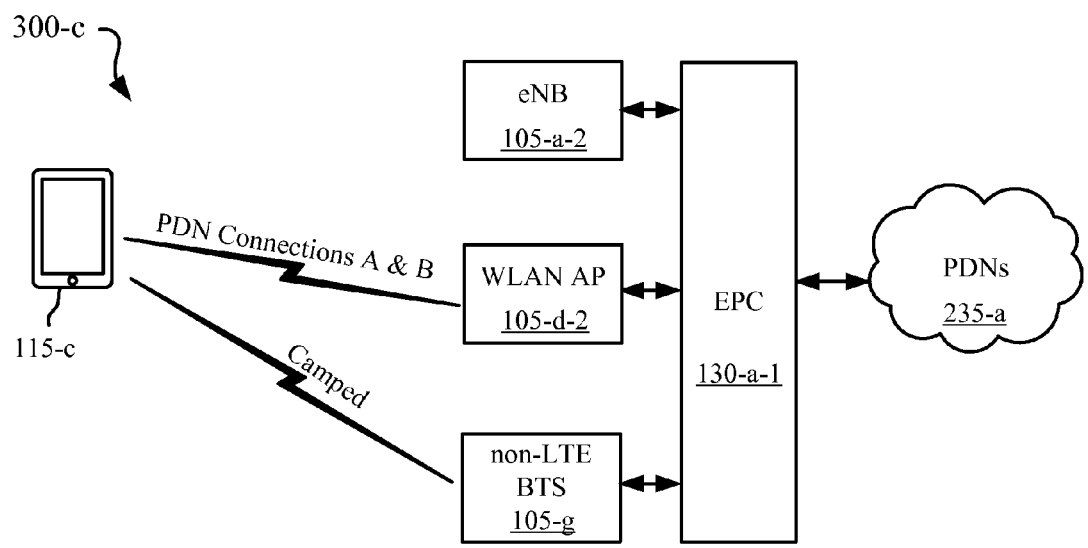
Figure 4A:
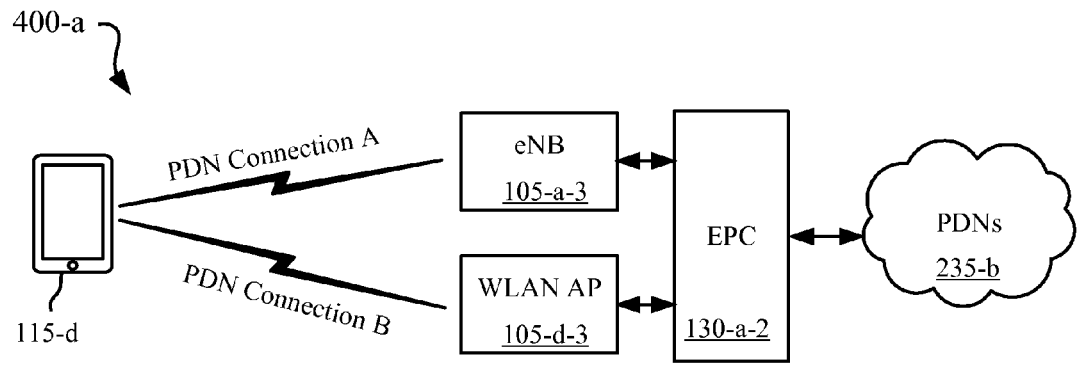
FIGS. 4A, 4B, and 4C illustrate an example of offloading all traffic of all PDN connections of a UE from an LTE access network and then allowing the UE to remain camped on the LTE access network, in accordance with various embodiments.
Figure 4B:
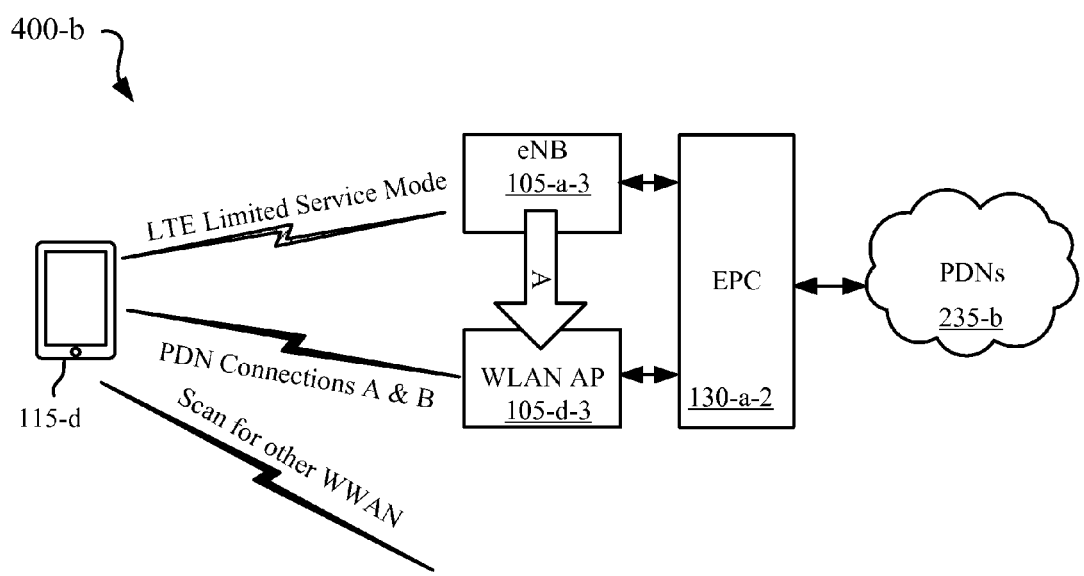
Figure 4C:
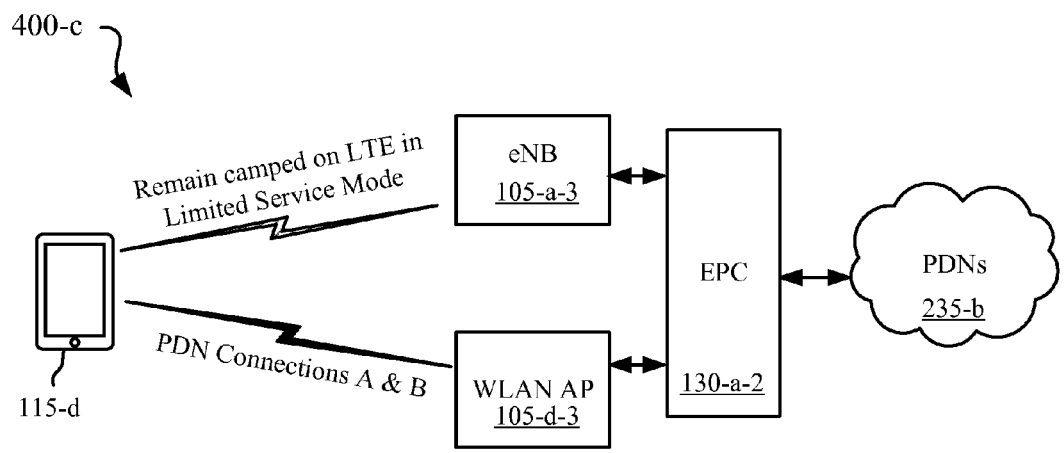

FIGS. 3A, 3B, 3C, 4A, 4B, and 4C provide examples of how all of the traffic of all of the PDN connections of a UE 115 may be offloaded to a WLAN access network. More particularly, FIGS. 3A, 3B, and 3C illustrate an example where all of the traffic of all of the PDN connections of a UE 115-c may be offloaded from an LTE access network (represented by eNB 105-a-2) to a WLAN access network (represented by WLAN access point (AP) 105-d-2) and then the UE 115-c may be disconnected from the LTE access network. In contrast, FIGS. 4A, 4B, and 4C illustrate an example where all of the traffic of all of the PDN connections of a UE 115-d may be offloaded from an LTE access network (represented by eNB 105-a-3) to a WLAN access network (represented by WLAN access point (AP) 105-d-3) and then the UE 115-d may remain camped on the LTE access network.

Referring now to FIG. 3A, a diagram illustrates a configuration of a wireless communications system 300-a in which a UE 115-c may have a PDN Connection A with a WWAN access network (e.g., with an eNB 105-a-2 of an LTE access network) and a PDN Connection B with a WLAN access network (e.g., with a WLAN AP 105-d-2 of the WLAN access network). The PDN Connection A and PDN Connection B may connect to different APNs over the respective WWAN and WLAN access networks. Each of the eNB 105-a-2 and the WLAN AP 105-d-2 may have a connection to an EPC 130-a-1, which may in turn have a connection to PDNs 235-a. The wireless communications system 300-a, UE 115-c, eNB 105-a-2, WLAN AP 105-d-2, EPC 130-a-1, and PDNs 235 may be examples of one or more aspects of the respective wireless communications system 100 or 200, UEs 115, eNBs 105-a, WLAN APs 105-d, EPC 130, and PDNs 235 described with reference to FIG. 1 and/or 2.

At some point during operation of the wireless communications system 300, a triggering event may cause all of the traffic of all of the PDN connections of the UE 115-c to be offloaded from the eNB 105-a-2 to the WLAN AP 105-d-2. In some cases, the triggering event may include a decision by an access network management module of the UE 115-c that a WLAN access network is preferred over the LTE access network. In other cases, the triggering event may include a PDN disconnection procedure initiated by the LTE access network for the last PDN connection of the UE 115-c with the LTE access network. In still other cases, the triggering event may be include activity (e.g., a request) of an application running on the UE 115-c, which application causes the UE 115-c to initiate PDN disconnection procedures for the last PDN connection of the UE 115-c on an EPC-capable radio access technology (RAT) other than LTE (e.g., eHRPD).

FIG. 3B is a diagram illustrating a configuration of a wireless communications system 300-b that may result from a triggering event causing all of the traffic of all of the PDN connections of the UE 115-c to be offloaded from the eNB 105-a-2 to the WLAN AP 105-d-2. In the configuration, the UE 115-c may have a PDN Connection A with the eNB 105-b-2 and a PDN Connection B with the WLAN AP 105-d-2. After the occurrence of the triggering event, the PDN Connection A and its traffic may be offloaded from the eNB 105-a-2 to the WLAN AP 105-d-2 as indicated by the arrow. In addition, and either before or after the occurrence of the triggering event, the UE 115-c may identify (e.g., detect by scanning for WWANs) a non-LTE WWAN access network available to the UE 115-c. A non-LTE WWAN access network is represented in FIG. 3B by the non-LTE BTS 105-g. By way of example, the non-LTE BTS 105-g may be an example of aspects of one or more of the access points 105 described with reference to FIG. 1 and/or 2, or aspects of eBTS 105-b, eAN 105-c, and/or BTS 105-f described with reference to FIG. 2. The non-LTE BTS 105-g is shown in FIG. 3B to have a connection with the EPC 130-a-1. In examples where the non-LTE BTS is a non-3GPP BTS (e.g., a 1x/HRPD BTS 105-f), the non-LTE BTS may not connect to the EPC 130-a-1, but may instead access one or more of the PDNs 235-a through a separate core network such as the 1x/HRPD core network 130-b shown in FIG. 2.

Either before or after detecting a non-LTE WWAN access network, the UE 115-c may determine that all traffic of all PDN connections of the UE 115-c is currently offloaded to the WLAN access network and enter a LTE limited service mode with the LTE access network. In the LTE limited service mode, the UE 115-c may camp on the most preferred available non-LTE WWAN access network. In the event the UE 115-c does not acquire any non-LTE WWAN access network, the UE 115-c may camp on, without attaching to, the available LTE access network. That is, the UE 115-c may receive system information block (SIB) messages from the LTE access network while refraining from transmitting and receiving data over PDN connections of the UE 115-c with the LTE access network. Alternatively, the UE 115-c may disable LTE completely in response to the determination that all traffic of all PDN connections is currently offloaded to the WLAN access network.

After determining that all traffic of all PDN connections is currently offloaded to the WLAN access network, the UE 115-c may also refrain from transmitting and receiving data over other (and in some cases all) WWAN PDN connections, and determine which of the available WWAN access networks, if any, the UE may camp on during the period that all traffic of all PDN connections is offloaded to the WLAN access network. To make this decision, the UE 115-c may assign a priority to each WWAN access network available to the UE with the LTE access network being the least preferred of the WWAN access networks. The UE may identify a highest-priority available WWAN access network, and then determine whether to camp on the highest-priority available WWAN access network. If multiple non-LTE WWAN access networks are available to the UE 115-c, the UE 115-c may prioritize the non-LTE WWAN access networks according to a known ranking. For example, eHRPD WWAN access networks may have a higher priority than GSM WWAN access networks, and GSM WWAN networks may have a higher priority than 1x/HRPD or 1x only access networks. On the other hand, if only an LTE access network is available to the UE 115-c, the UE 115-c may either camp on the LTE access network without attaching to the LTE access network or disable LTE functionality while the traffic from its PDN connections remains offloaded to WLAN.

In the present example, both the LTE eNB 105-a-2 and the non-LTE BTS 105-g may be available to the UE 115-c following offloading of traffic for all of its PDN connections to WLAN AP 105-d-2. The UE may assign a higher priority to the non-LTE BTS 105-g than the eNB 105-a-1. Therefore, the UE 115-c may select the non-LTE BTS 105-g to camp on while traffic from all of the PDN connections remains offloaded to WLAN AP 105-d-2.

FIG. 3C is a diagram illustrating a configuration of a wireless communications system 300-c that may result after the UE 115-c has not only identified a non-LTE WWAN access network, but camped on the non-LTE BTS 105-g of the non-LTE WWAN access network. At this point, the UE 115-c may disconnect from the eNB 105-a-2 of the LTE access network.

By way of example, two PDN connections (e.g., PDN Connection A and PDN Connection B) are shown in each of FIGS. 3A, 3B, and 3C. However, in other examples, there could be any number of PDN connections that are offloaded from a WWAN access network to a WLAN access network. New PDN connections may also be established with a WLAN access network—either before or after the offload of all traffic of all PDN connections to the WLAN access network.

Referring now to FIG. 4A, a diagram illustrates a configuration of a wireless communications system 400-a in which a UE 115-d may have a PDN Connection A with an LTE WWAN access network (e.g., through an eNB 105-a-3 of the LTE access network) and a PDN Connection B with a WLAN access network (e.g., through a WLAN AP 105-d-3 of the WLAN access network). The PDN Connection A and PDN Connection B may connect to different APNs over the respective WWAN and WLAN access networks. Each of the eNB 105-a-3 and the WLAN AP 105-d-3 may have a connection to an EPC 130-a-2, which may in turn have a connection to PDNs 235. The wireless communications system, UE 115-d, eNB 105-a-3, WLAN AP 105-d-3, EPC 130-a-2, and PDNs 235-b may be examples of one or more aspects of the respective wireless communications system 100 or 200, UEs 115, eNBs 105-a, WLAN APs 105-d, EPC 130, and PDNs 235 described with reference to FIG. 1 and/or 2.

At some point during operation of the wireless communications system 400, a triggering event may cause all of the traffic of all of the PDN connections of the UE 115-d to be offloaded from the eNB 105-a-3 to the WLAN AP 105-d-3. In some cases, the triggering event may include a decision by an access network management module of the UE 115-d that a WLAN access network is preferred over the LTE access network. In other cases, the triggering event may include a PDN disconnection procedure initiated by the LTE access network for the last PDN connection of the UE 115-c with the LTE access network. In still other cases, the triggering event may include activity (e.g., a request) of an application running on the UE 115-d, which application causes the UE 115-d to initiate PDN disconnection procedures for the last PDN connection of the UE 115-d on an EPC-capable radio access technology (RAT) other than LTE (e.g., eHRPD).

FIG. 4B is a diagram illustrating a configuration of a wireless communications system 400-b that may result from a triggering event causing all of the traffic of all of the PDN connections of the UE 115-d to be offloaded from the eNB 105-a-3 to the WLAN AP 105-d-3. In the configuration, the UE 115-d may have a PDN Connection A with the eNB 105-a-3 and a PDN Connection B with the WLAN AP 105-d-3. After the occurrence of the triggering event, the PDN Connection A and its traffic may be offloaded from the eNB 105-a-3 to the WLAN AP 105-d-3 as indicated by the arrow. In addition, and either before or after the occurrence of the triggering event, the UE 115-d may attempt to identify (e.g., detect by scanning for WWANs) a non-LTE WWAN access network available to the UE 115-d. However, in the example shown, no such non-LTE WWAN access network may be identified.

Either before or after attempting to identify a non-LTE WWAN access network, the UE 115-d may determine that all traffic of all PDN connections of the UE 115-d is currently offloaded to the WLAN access network and enter an LTE limited service mode with the LTE access network. In the LTE limited service mode, the UE 115-d may receive system information block (SIB) messages from the LTE access network while refraining from transmitting and receiving data over PDN connections of the UE 115-d with the LTE access network. Alternatively, the UE 115-d may disable LTE functionality completely. After determining that all traffic of all PDN connections is currently offloaded to the WLAN access network, the UE 115-d may also refrain from transmitting and receiving data over other (and in some cases all) WWAN PDN connections.

FIG. 4C is a diagram illustrating a configuration of a wireless communications system 400-c that may result after the UE 115-d has failed to identify a non-LTE WWAN access network. Because the UE 115-d failed to identify a non-LTE WWAN access network, the UE 115-d may remain camped on the eNB 105-a-3 of the LTE access network without attaching to the LTE access network. Alternately, the UE 115-d could disable LTE functionality completely and disconnect from the eNB 105-a-3 while all traffic from all of the PDN connections remains offloaded to the WLAN access network.

By way of example, two PDN connections (e.g., PDN Connection A and PDN Connection B) are shown in each of FIGS. 4A, 4B, and 4C. However, in other examples, there could be any number of PDN connections that are offloaded from a WWAN access network to a WLAN access network. New PDN connections may also be established with a WLAN access network—either before or after the offload of all traffic of all PDN connections to the WLAN access network.

Figure 5A:
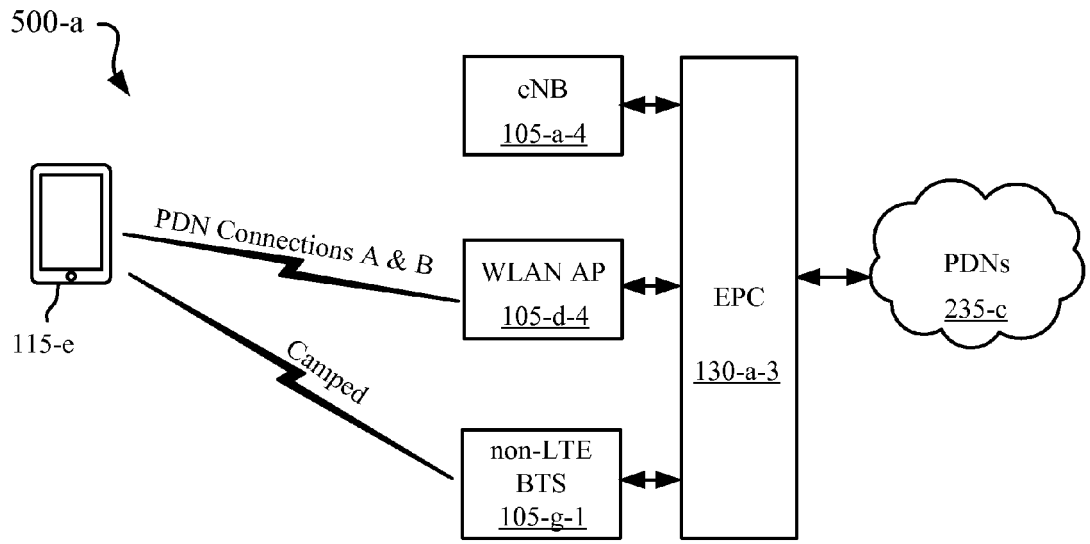
FIGS. 5A, 5B, 5C, 6A, 6B, 6C, 7A, 7B, 7C, 8A, 8B, and 8C provide examples of how the traffic of some or all of the PDN connections of a UE may be transferred back to a WWAN access network, in accordance with various embodiments.
Figure 5B:
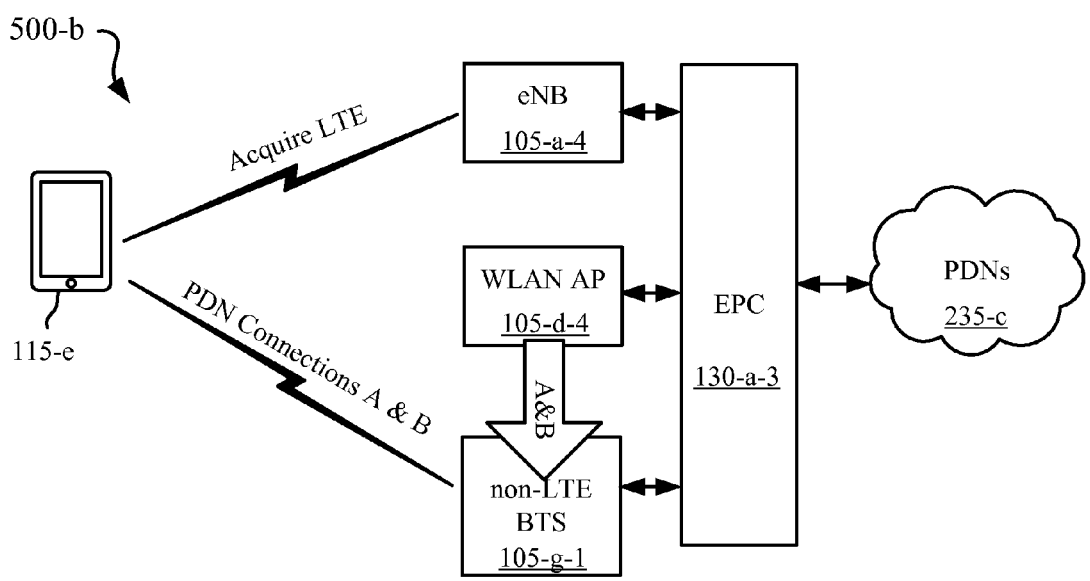
Figure 5C:
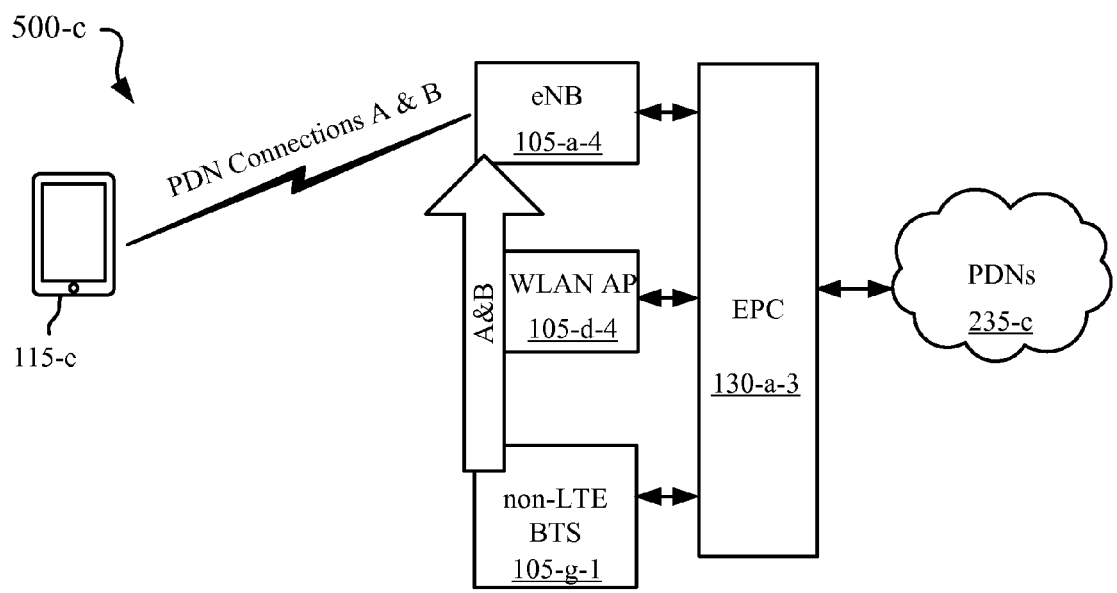
Figure 6A:
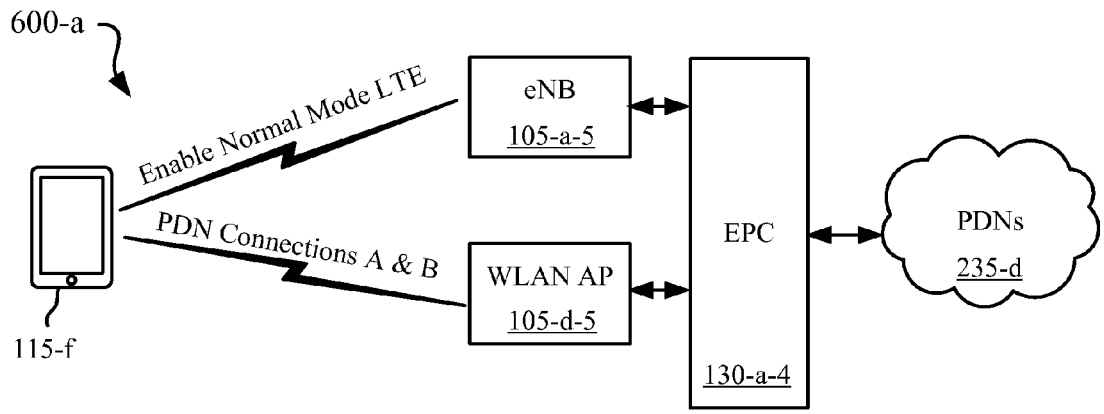
Figure 6B:
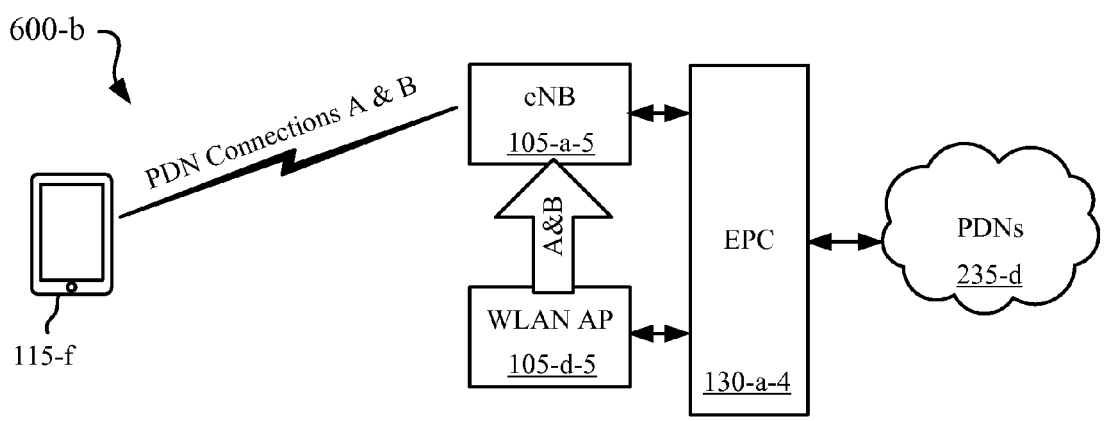
Figure 6C:
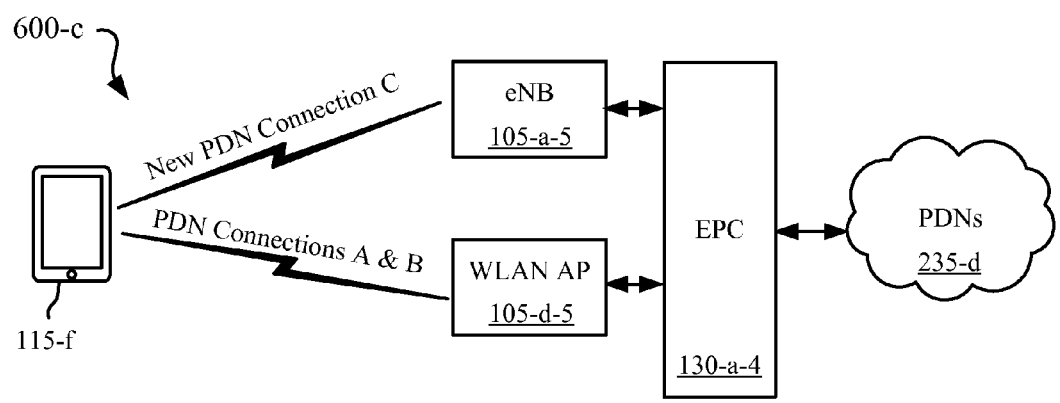
Figure 7A:
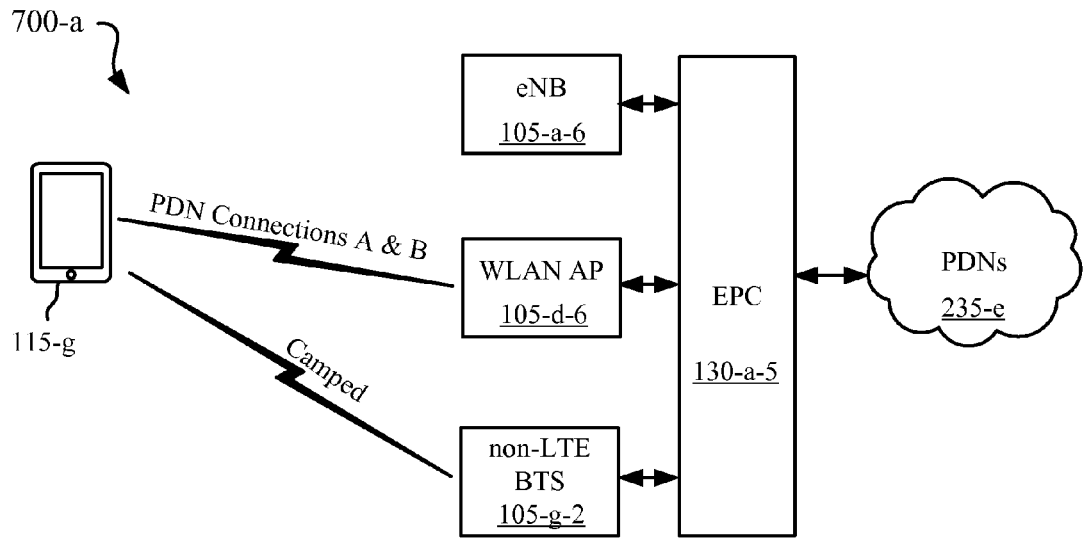
Figure 7B:
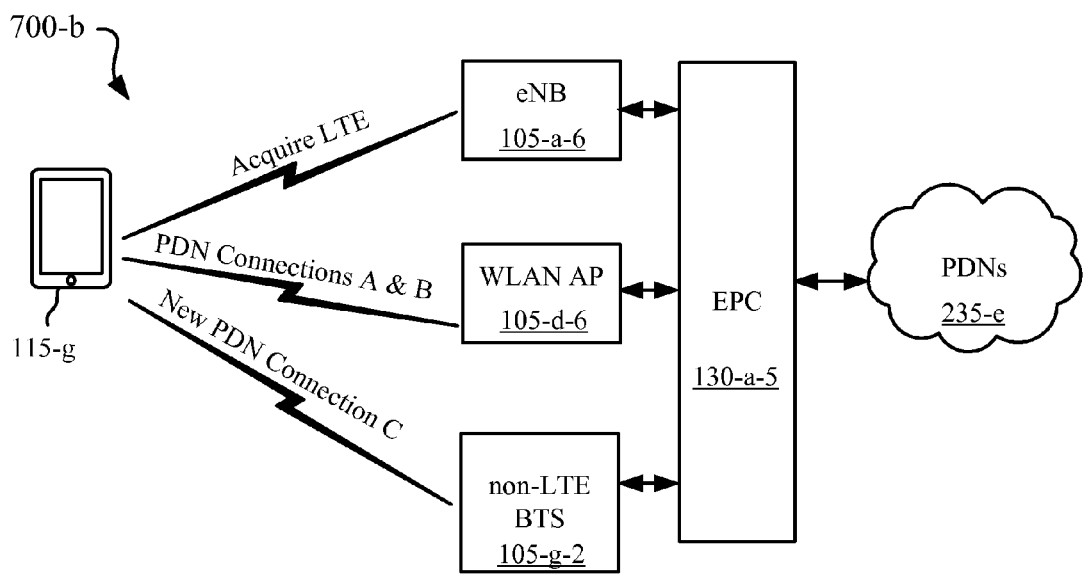
Figure 7C:
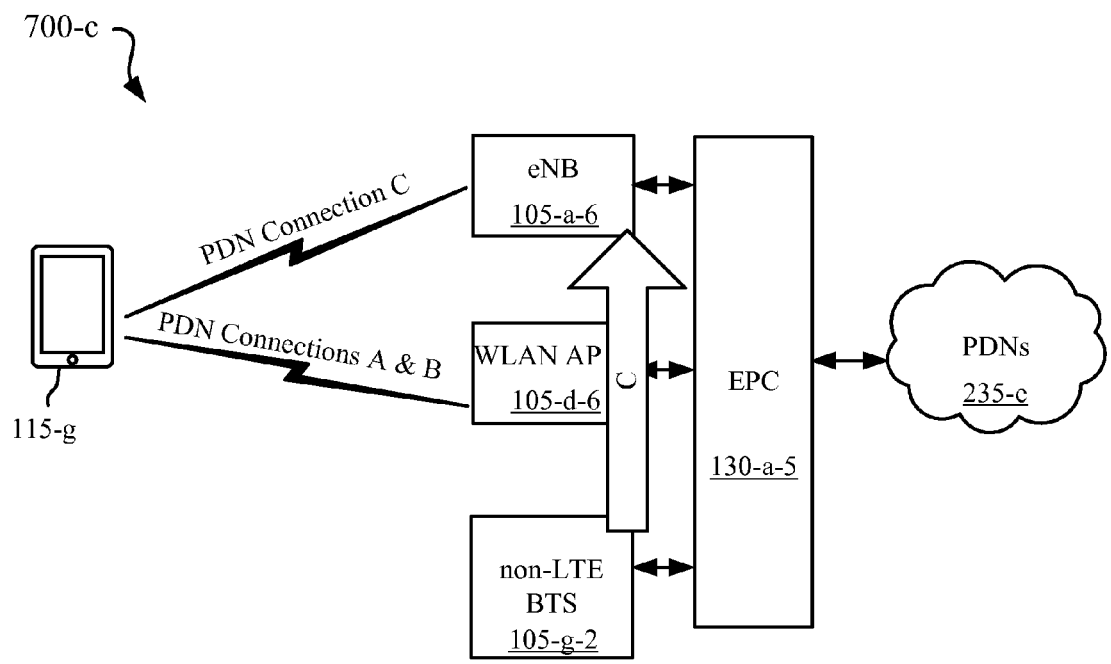
Figure 8A:
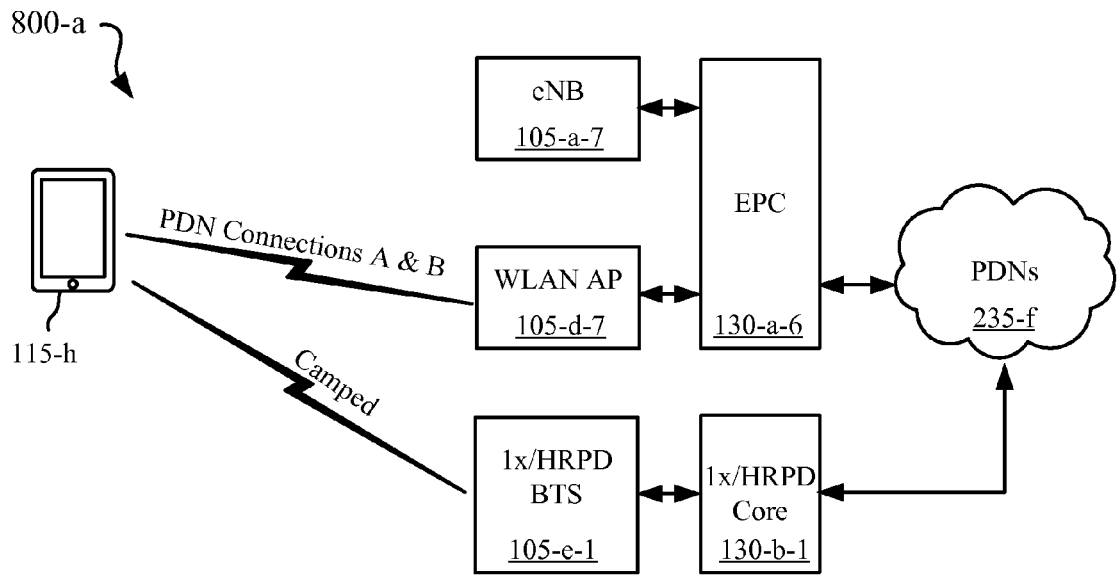
Figure 8B:
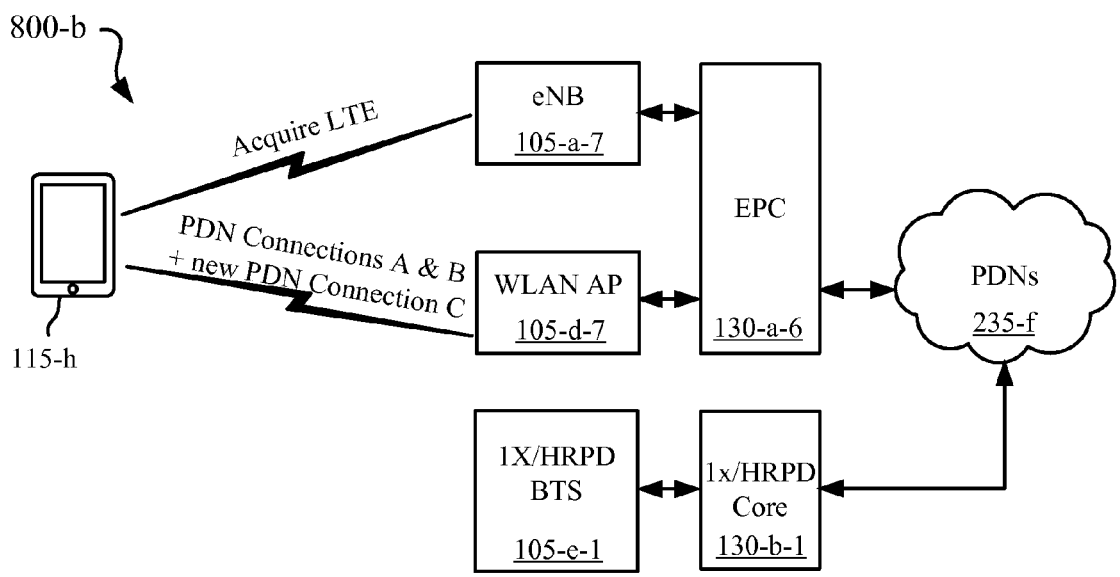
Figure 8C:
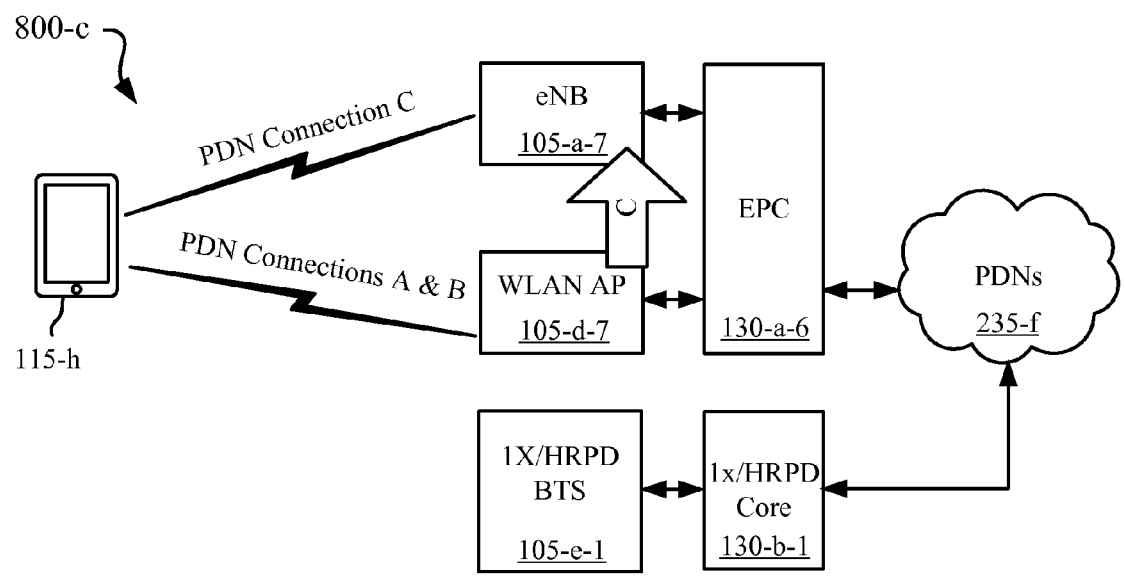

FIGS. 5A, 5B, 5C, 6A, 6C, 6B, 7A, 7B, 7C, 8A, 8B, and 8C provide examples of how the traffic of some or all of the PDN connections of a UE 115 may be transferred back to a WWAN access network following a triggering event at the UE 115. More particularly, FIGS. 5A, 5B, and 5C illustrate an example where the traffic of PDN connections of a UE 115-e may be transferred back to an LTE access network (represented by eNB 105-a-4) after first establishing a number of PDN connections with a non-LTE WWAN access network (represented by non-LTE BTS 105-g-1). FIGS. 6A, 6B and 6C illustrate an example where the traffic of PDN connections of a UE 115-f may be transferred back to an LTE access network with which the UE 115-f remained camped on the LTE WWAN access network in a limited services mode. FIGS. 7A, 7B, and 7C illustrate an example where a PDN connection with a non-LTE WWAN access network (represented by non-LTE BTS 105-g-2) may be established after the traffic of all PDN connections with an LTE access network (represented by eNB 105-a-6) have been offloaded from the LTE access network, and where the traffic of the new PDN connection may be subsequently transferred to the LTE access network. FIGS. 8A, 8B, and 8C illustrate an example where a PDN connection with a WLAN access network (represented by WLAN AP 105-d-7) may be established after the traffic of all PDN connections with an LTE access network (represented by eNB 105-a-7) have been offloaded from the LTE access network, and where the traffic of the new PDN connection may be subsequently transferred to the LTE access network.

Referring now to FIG. 5A, a diagram illustrates a configuration of a wireless communications system 500-a in which all traffic of all PDN connections of a UE 115-e have been offloaded to a WLAN access network represented by a WLAN AP 105-d-4. The UE 115-e may have a PDN Connection A and a PDN Connection B with the WLAN access network. At the same time, the UE 115-e may be within range of one or more WWAN access networks (e.g., within range of an eNB 105-a-4 of an LTE access network and/or within range of a non-LTE BTS 105-g-1 of an EPC-capable non-LTE WWAN access network). For purpose of illustration, the UE 115-e may be disconnected from the eNB 105-a-4, but camped on the non-LTE BTS 105-g-1. Each of the eNB 105-a-4 the WLAN AP 105-d-4, and the EPC-capable non-LTE BTS 105-g-1 may have a connection to an EPC 130-a-3, which may in turn have a connection to PDNs 235-c. The wireless communications system, UE 115-e, eNB 105-a-4, WLAN AP 105-d-4, EPC 130-a-3, and PDNs 235-c may be examples of one or more aspects of the respective wireless communications system 100 or 200, UEs 115, eNBs 105-a, WLAN APs 105-d, EPC 130, and PDNs 235 described with reference to FIG. 1, 2, 3A, 3B, 3C, 4A, 4B, and/or 4C. By way of example, the non-LTE BTS 105-g-1 may be an example of aspects of one or more of the base stations 105 described with reference to FIG. 1 and/or 2, or aspects of eBTS 105-b and/or BTS 105-c described with reference to FIG. 2.

At some point during operation of the wireless communications system 500, the UE 115-e may detect a triggering event that causes the UE 115-e to establish a PDN connection with an available WWAN access network according to a current WWAN camping status of the UE 115-e and a WLAN offload policy. In the example shown in FIG. 5A, the camping status of the UE 115-e is that of "not camped" with the eNB 105-a-4, and "camped" with the non-LTE BTS 105-g-1. In some cases, the triggering event may include a determination to transfer an existing PDN connection from the WLAN access network to the available WWAN access network (e.g., because WLAN access has deteriorated to an unacceptable level; because an application requests that a handover of an existing PDN connection be made to WWAN; or because the UE's access network management module (e.g., module 1130 of FIG. 11) determines that WWAN is preferred over WLAN because, for example, the condition of a RAT changes).

FIG. 5B is a diagram illustrating a configuration of a wireless communications system 500-b that may result from the triggering event that causes the UE 115-e to establish a PDN connection with an available WWAN access network according to the current WWAN camping status of the UE 115-*e* and the WLAN offload policy. In the configuration, and before or after occurrence of the triggering event, the UE 115-*e* may determine that the UE 115-*e* is camped on an EPC-capable non-LTE WWAN access network while refraining from transmitting and receiving data over WWAN PDN connections. Then, in response to the triggering event, the UE 115-*e* may attempt to transfer one or more of its existing PDN connections (e.g., PDN Connection A and PDN Connection B) to the EPC-capable non-LTE WWAN access network (e.g., to the non-LTE BTS 105-*g*-1 of the EPC-capable non-LTE WWAN access network) as indicated by the arrow. Before or after transfer of the PDN connections, and also in response to the triggering event, the UE 115-*e* may perform at least one of enabling LTE functionality or placing itself in an LTE normal mode. After enabling LTE functionality, the UE 115-*e* may scan for and attempt to attach to an LTE access network (e.g., to the eNB 105-*a*-4).

FIG. 5C is a diagram illustrating a configuration of a wireless communications system 500-*c* that may result from the UE 115-*e* placing itself in the LTE normal mode and attaching to an LTE access network (i.e., acquiring LTE service). After attaching to an LTE access network, the UE 115-*e* may attempt to transfer one or more of its existing PDN connections (both PDN Connection A and PDN Connection B in the example shown) from the EPC-capable non-LTE WWAN access network (represented by the non-LTE BTS 105-*g*-1) to the LTE access network (represented by the eNB 105-*a*-3).

The operations described with respect to FIGS. 5B & 5C are particularly applicable to a UE 115-*e* communicating with a non-LTE BTS 105-*g*-1 of an EPC-capable non-LTE WWAN access network. In alternate embodiments, a non-LTE BTS may belong to a non-EPC-capable non-LTE WWAN access network (e.g., the non-LTE BTS may be a non-3GPP BTS such as a 1x/HRPD BTS 105-*f* or 1x only BTS). In these embodiments, the non-LTE BTS may not connect to the EPC 130-*a*-3, but may instead access one or more of the PDNs 235-*c* through a separate core network such as the 1x/HRPD core network 130-*b* described with reference to FIG. 2. In these embodiments, the UE 115-*e* may, in response to the triggering event, perform at least one of enabling LTE functionality or placing the UE 115-*e* in an LTE normal mode. In response to the UE 115-*e* attaching to the LTE access network or entering the LTE normal mode, the UE 115-*e* may attempt to transfer one or more of its existing PDN connections (e.g., PDN Connection A and/or PDN Connection B) from the WLAN access network to the LTE access network. In certain examples, a state of the UE may change such that the condition triggering the attempt to transfer the PDN connection(s) is no longer satisfied prior to the UE attaching to the LTE access network. In such examples, the UE may return to the LTE limited service mode or disable LTE functionality without transferring the PDN connection(s) to the LTE access network.

By way of example, two PDN connections (e.g., PDN Connection A and PDN Connection B) are shown in each of FIGS. 5A, 5B, and 5C. However, in other examples, there could be any number of PDN connections that are transferred between access networks.

Referring now to FIG. 6A, a diagram illustrates a configuration of a wireless communications system 600-*a* in which all traffic of all PDN connections of a UE 115-*f* have been offloaded to a WLAN access network (represented by a WLAN AP 105-*d*-5 of the WLAN access network). The UE 115-*f* may have a PDN Connection A and a PDN Connection B with the WLAN access network. At the same time, the UE 115-*f* may be camped on an LTE access network (represented by the eNB 105-*a*-5) in limited service mode, or have disabled LTE functionality while the traffic of the PDN connections remains offloaded. Each of the eNB 105-*a*-5 and the WLAN AP 105-*d*-5 may have a connection to an EPC 130-*a*-4, which may in turn have a connection to PDNs 235-*d*. The wireless communications system 600, UE 115-*f*, eNB 105-*a*-5, WLAN AP 105-*d*-5, EPC 130-*a*-4, and PDNs 235-*d* may be examples of one or more aspects of the respective wireless communications system 100 or 200, UEs 115, eNBs 105-*a*, WLAN APs 105-*d*, EPC 130, and PDNs 235 described with reference to FIG. 1, 2, 3A, 3B, 3C, 4A, 4B, and/or 4C.

At some point during operation of the wireless communications system, the UE 115-*f* may detect a triggering event that causes the UE 115-*f* to establish a PDN connection with an available WWAN access network according to a current WWAN camping status of the UE 115-*f* and a WLAN offload policy. In some cases, the triggering event may include a determination to transfer an existing PDN connection from the WLAN access network to the available WWAN access network (e.g., because WLAN access has deteriorated to an unacceptable level; because an application requests that a handover of an existing PDN connection be made to WWAN; or because the UE's access network management module (e.g., module 1130 of FIG. 11) determines that WWAN is preferred over WLAN because, for example, the condition of a RAT changes). In other cases, the triggering event may include a request received at the UE 115-*f* to establish a new data connection supported by only WWAN access networks. In still other cases, the triggering event may include an application request to establish a new PDN connection for which WWAN has a higher priority than WLAN.

Before or after the occurrence of the triggering event, the UE 115-*f* may determine that it is camped on the LTE access network in a limited service mode and refraining from transmitting and receiving data over WWAN PDN connections. Alternately, the UE 115-*f* may determine that it has disabled LTE functionality and is not camping on any WWAN access network while it refrains from transmitting and receiving data over WWAN PDN connections. The UE 115-*f* may, in response to the triggering event, enable LTE functionality and/or place itself in an LTE normal mode. In the LTE normal mode, the UE 115-*f* may scan for and attempt to attach to an LTE access network (e.g., via the eNB 105-*a*-5). Or, if the UE 115-*f* is already camped on the LTE access network (e.g., in a LTE limited service mode), the UE 115-*f* may simply enable the transmitting and receiving of data over the LTE access network to attach to the LTE access network. In cases where the UE 115-*f* disabled LTE functionality prior to the triggering event, the UE 115-*f* may only attempt to attach to an LTE access network for a threshold amount of time. If the UE 115-*f* does not attach to an LTE access network within the threshold amount of time, a failure may be returned (e.g., in cases where an application requested a new PDN connection, a failure may be returned to the application).

FIG. 6B is a diagram illustrating a configuration of a wireless communications system 600-*b* that may result from the UE 115-*f* placing itself in the LTE normal mode and attaching to the LTE access network (i.e., acquiring LTE service). In response to attaching to the LTE access network, and assuming, for example, that the triggering event includes a determination to transfer an existing PDN connection from the WLAN access network to the available WWAN access network, the UE 115-*f* may attempt to transfer one or more of its existing PDN connections (both PDN Connection A and PDN Connection B in the example shown as indicated by the arrow) from the WLAN access network (e.g., from WLAN AP 105-*d*-5) to the LTE access network (e.g., to the eNB 105-*a*-5). Upon determining that the transfer was successful, the UE 115-*e* may release the data connection over the WLAN AP 105-*d*-5.

FIG. 6C is a diagram illustrating another configuration of a wireless communications system 600-*c* that may result from the UE 115-*f* placing itself in the LTE normal mode and attaching to the LTE access network (i.e., acquiring LTE service). In response to attaching to the LTE access network, and assuming, for example, that the triggering event includes 1) a request received at the UE 115-*f* to establish a new data connection supported by only WWAN access networks or 2) an application request to establish a new PDN connection for which WWAN has a higher priority than WLAN, the UE 115-*f* may establish a New PDN Connection C with the LTE access network. In some cases, one or more of the UE's existing connections (e.g., PDN Connection A or PDN Connection B) may be transferred to the LTE access network. If all of the traffic on the PDN connections with the WLAN AP 105-*d*-5 are transferred to the LTE access network, the UE 115-*f* may release the data connections over the WLAN AP 105-*d*-5.

By way of example, two or three PDN connections (e.g., PDN Connection A, PDN Connection B, and/or New PDN Connection C) are shown in each of FIGS. 6A, 6B, and 6C. However, in other examples, there could be any number of PDN connections that are transferred between or established with access networks.

Referring now to FIG. 7A, a diagram illustrates a configuration of a wireless communications system 700-*a* in which all traffic of all PDN connections of a UE 115-*g* have been offloaded to a WLAN access network (represented by a WLAN AP 105-*d*-6 of the WLAN access network). The UE 115-*g* may have a PDN Connection A and a PDN Connection B with the WLAN access network. At the same time, the UE 115-*g* may be within range of one or more EPC-capable WWAN access networks (e.g., within range of an eNB 105-*a*-6 of an LTE access network and/or within range of a non-LTE BTS 105-*g*-2 of an eHRPD or GSM WWAN access network). For purpose of illustration, the UE 115-*g* may be disconnected from the eNB 105-*a*-6, but camped on the non-LTE BTS 105-*g*-2. Each of the eNB 105-*a*-6, the WLAN AP 105-*d*-6, and the non-LTE BTS 105-*g*-2 may have a connection to an EPC 130-*a*, which may in turn have a connection to PDNs 235. The wireless communications system, UE 115-*g*, eNB 105-*a*-6, WLAN AP 105-*d*-6, EPC 130-*a*-5, and PDNs 235-*e* may be examples of one or more aspects of the respective wireless communications system 100 or 200, UEs 115, eNBs 105-*a*, WLAN APs 105-*d*, EPC 130, and PDNs 235 described with reference to FIG. 1, 2, 3A, 3B, 3C, 4A, 4B, and/or 4C. By way of example, the non-LTE BTS 105-*g* may be an example of aspects of one or more of the base stations 105 described with reference to FIG. 1 and/or 2, or aspects of eBTS 105-*b* and/or BTS 105-*c* described with reference to FIG. 2.

At some point during operation of the wireless communications system, the UE 115-*g* may detect a triggering event that causes the UE 115-*g* to establish a PDN connection with an available WWAN access network according to a current WWAN camping status of the UE 115-*g* and a WLAN offload policy. In the example shown in FIG. 7A, the camping status of the UE 115-*g* is that of "not camped" with the eNB 105-*a*-6, and "camped" with the non-LTE BTS 105-*g*-2. In some cases, the triggering event may include a request received at the UE 115-*g* to establish a new data connection supported by only WWAN access networks. In other cases, the triggering event may include an application request to establish a new PDN connection for which WWAN has a higher priority than WLAN.

FIG. 7B is a diagram illustrating a configuration of a wireless communications system 700-*b* that may result from the triggering event that causes the UE 115-*g* to establish a PDN connection with an available WWAN access network according to the current WWAN camping status of the UE 115-*g* and the WLAN offload policy. In the wireless communications system configuration, and before or after occurrence of the triggering event, the UE 115-*g* may determine that the UE 115-*g* is camped on an EPC-capable non-LTE WWAN access network while refraining from transmitting and receiving data over WWAN PDN connections. Then, in response to the triggering event, the UE 115-*g* may establish a New PDN Connection C with the EPC-capable non-LTE WWAN access network. Before or after establishment of the New PDN Connection C, and also in response to the triggering event, the UE 115-*g* may perform at least one of enabling LTE functionality or placing itself in an LTE normal mode. After enabling LTE functionality, the UE 115-*g* may scan for and attempt to attach to an LTE access network (e.g., to the eNB 105-*a*-6).

FIG. 7C is a diagram illustrating a configuration of a wireless communications system 700-*c* that may result from the UE 115-*g* enabling LTE and/or placing itself in the LTE normal mode and attaching to an LTE access network (i.e., acquiring LTE service). After attaching to an LTE access network, the UE 115-*g* may attempt to transfer the New PDN connection C from the EPC-capable non-LTE WWAN access network (represented by the non-LTE BTS 105-*g*-2) to the LTE access network (represented by the eNB 105-*a*-6) as indicated by the arrow.

By way of example, two or three PDN connections (e.g., PDN Connection A, PDN Connection B, and/or New PDN Connection C) are shown in each of FIGS. 7A, 7B, and 7C. However, in other examples, there could be any number of PDN connections that are transferred between or established with access networks.

Referring now to FIG. 8A, a diagram illustrates a configuration of a wireless communications system 800-*a* in which all traffic of all PDN connections of a UE 115-*h* have been offloaded to a WLAN access network (represented by a WLAN AP 105-*d*-7 of the WLAN access network). The UE 115-*h* may have a PDN Connection A and a PDN Connection B with the WLAN access network. At the same time, the UE 115-*h* may be within range of one or more WWAN access networks (e.g., within range of an eNB 105-*a*-7 of an LTE access network and/or within range of a 1x/HRPD BTS 105-*e*-1 of a non-EPC-capable non-LTE WWAN access network). For purpose of illustration, the UE 115-*h* may be disconnected from the eNB 105-*a*-7, but camped on the 1x/HRPD BTS 105-*e*-1. Each of the eNB 105-*a*-7 and the WLAN AP 105-*d*-7 may have a connection to an EPC 130-*a*-6, which may in turn have a connection to PDNs 235-*f*. The 1x/HRPD BTS 105-*e*-1 may have a connection to a 1x/HRPD core 130-*b*-1, which may in turn have a connection to PDNs 235-*f*. The wireless communications system, UE 115-*h*, eNB 105-*a*-7, WLAN AP 105-*d*-7, EPC 130-*a*-6, and PDNs 235-*f* may be examples of one or more aspects of the respective wireless communications system 100 or 200, UEs 115, eNBs 105-*a*, WLAN APs 105-*d*, EPC 130, and PDNs 235 described with reference to FIG. 1, 2, 3A, 3B, 3C, 4A, 4B, and/or 4C. By way of example, the 1x/HRPD BTS 105-e-1 may be an example of aspects of one or more of the access points 105 described with reference to FIG. 1 and/or 2, or aspects of BTS 105-e described with reference to FIG. 2.

At some point during operation of the wireless communications system, the UE 115h may detect a triggering event that causes the UE 115-h to establish a PDN connection with an available WWAN access network according to a current WWAN camping status of the UE 115-h and a WLAN offload policy. In the example shown in FIG. 8A, the camping status of the UE 115-h is that of "not camped" with the eNB 105-a-7, and "camped" with the 1x/HRPD BTS 105-e-1. In some cases, the triggering event may include an application request to establish a new PDN connection for which WWAN has a higher priority than WLAN.

FIG. 8B is a diagram illustrating a configuration of a wireless communications system 800-b that may result from the triggering event that causes the UE 115-h to establish a PDN connection with the WLAN access network according to the current WWAN camping status of the UE 115-h and the WLAN offload policy. In the wireless communications system configuration, and before or after occurrence of the triggering event, the UE 115-g may determine that it is camped on a non-EPC-capable non-LTE WWAN access network while refraining from transmitting and receiving data over WWAN PDN connections. Then, in response to the triggering event, the UE 115-h may establish a New PDN Connection C with the WLAN access network (e.g., with the WLAN AP 105-d-7). Before or after establishment of the New PDN Connection C, and also in response to the triggering event, the UE 115-h may perform at least one of enabling LTE functionality or placing itself in an LTE normal mode. After enabling LTE functionality, the UE 115-h may scan for and attempt to attach to an LTE access network (e.g., to the eNB 105-a-7). Upon attaching to the LTE access network, the UE 115-h may disconnect from the 1x/HRPD BTS 105-e-1.

FIG. 8C is a diagram illustrating a configuration of a wireless communications system 800-c that may result from the UE 115-h enabling LTE and/or placing itself in the LTE normal mode and attaching to an LTE access network (i.e., acquiring LTE service). After attaching to an LTE access network, the UE 115-h may attempt to transfer the New PDN connection C from the WLAN access network (represented by the WLAN AP 105-d-7) to the LTE access network (represented by the eNB 105-a-7).

In additional or alternative examples, the triggering event may be associated with establishing a new PDN connection which may only be established over WWAN (e.g., a PDN connection associated with a carrier-specific service). In such examples, the UE may establish data connectivity over the 1x/HRPD BTS 105-e-1, enable LTE functionality, and/or place the UE back into LTE normal mode. In the event that the UE subsequently acquires and attaches to the LTE access network via eNB 105-a-7, the UE may tear down the data connection established over 1x/HRPD and establish a new PDN connection over LTE. In certain examples, if the new PDN connection associated with the triggering event is not an attach PDN, the UE may tear down the 1x/HRPD data connection and establish the new PDN connection at the LTE access network in response to a request by an application.

By way of example, two or three PDN connections (e.g., PDN Connection A, PDN Connection B, and/or New PDN Connection C) are shown in each of FIGS. 8A, 8B, and 8C. However, in other examples, there could be any number of PDN connections that are transferred between or established with access networks.

Figure 9A:
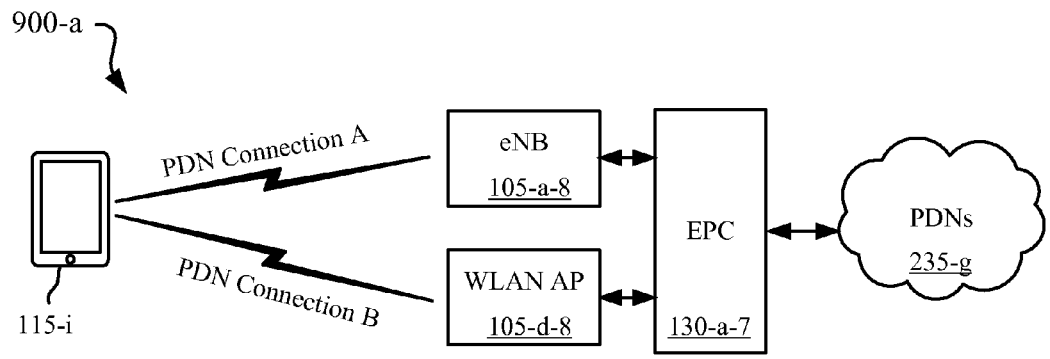
FIGS. 9A and 9B provide an example of how all of the traffic of all of the PDN connections of a UE may be offloaded to a WLAN access network when a WWAN PDN connection of the UE is subject to non-seamless WLAN offloading (NSWO), in accordance with various embodiments.
Figure 9B:
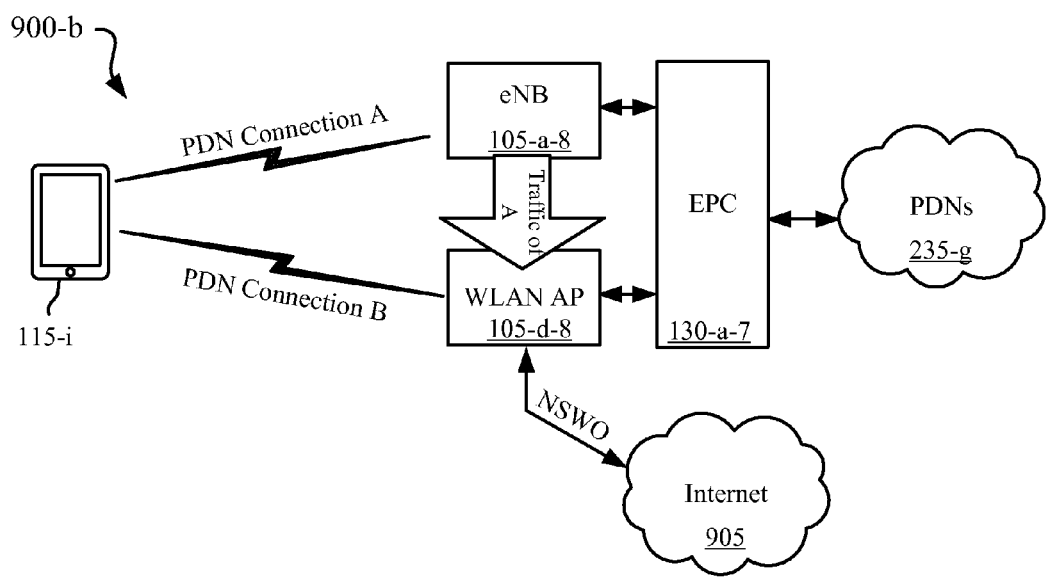

FIGS. 9A and 9B provide an example of how all of the traffic of all of the PDN connections of a UE may be offloaded to a WLAN access network when a WWAN PDN connection of the UE is subject to non-seamless WLAN offloading (NSWO) (e.g., in a case where a particular APN (e.g., an Internet APN) always uses NSWO when offloading traffic to WLAN. More particularly, FIG. 9A provides a diagram that illustrates a configuration of a wireless communications system 900-a in which a UE 115-i may have a PDN Connection A with a WWAN access network (e.g., with an eNB 105-a-8 of an LTE access network) and a PDN Connection B with a WLAN access network (e.g., with a WLAN AP 105-d-8 of the WLAN access network). The PDN Connection A and PDN Connection B may connect to different APNs over the respective WWAN and WLAN access networks. Each of the eNB 105-a-8 and the WLAN AP 105-d-8 may have a connection to an EPC 130-a-7, which may in turn have a connection to PDNs 235-g. The WLAN AP 105-d-8 may also have a direct connection to the Internet 905. The wireless communications system, UE 115-i, eNB 105-a-8, WLAN AP 105-d-8, EPC 130-a-7, and PDNs 235-g may be examples of one or more aspects of the respective wireless communications system 100 or 200, UEs 115, eNBs 105-a, WLAN APs 105-d, EPC 130, and PDNs 235 described with reference to FIG. 1 and/or 2.

At some point during operation of the wireless communications system, a triggering event may cause all of the traffic of all of the PDN connections of the UE 115-i to be offloaded from the eNB 105-a-8 to the WLAN AP 105-d-8. In some cases, the triggering event may include a decision made by an access network management module of the UE 115-h, which decision may be a decision that a WLAN access network is preferred over the LTE access network. In other cases, the triggering event may include a PDN disconnection procedure initiated by the LTE access network for the last PDN connection of the UE 115-i with the LTE access network. In still other cases, the triggering event may include activity (e.g., a request) of an application running on the UE 115-i, which application causes the UE 115-i to initiate PDN disconnection procedures for the last PDN connection of the UE 115-i on an EPC-capable radio access technology (RAT) other than LTE (e.g., eHRPD).

FIG. 9B is a diagram illustrating a configuration of a wireless communications system 900-b that may result from a triggering event causing all of the traffic of all of the PDN connections of the UE 115-i to be offloaded from the eNB 105-a-8 to the WLAN AP 105-d-8. Either before or after the occurrence of the triggering event, the UE 115-i may determine that a given PDN connection of the UE 115-i (e.g., the PDN Connection A with the eNB 105-a-8) is subject to NSWO, and in some cases may determine that the given PDN connection of the UE 115-i is the last PDN connection of the UE 115-i established over an LTE access network. Based on the determination that the PDN Connection A with the eNB 105-a-8 is subject to NSWO, and in some cases based on the further determination that the PDN Connection A is the last PDN connection of the UE 115-i established over an LTE access network, the UE 115-i may maintain (or remain attached to) the PDN Connection A with the eNB 105-a-8 The UE 115-i may also maintain the PDN Connection B with the WLAN AP 105-d-8. However, after the occurrence of the triggering event, the traffic of the PDN Connection A with the eNB 105-a-8 may be offloaded to the WLAN AP 105-d-8. Because the PDN Connection A with the eNB 105-*a*-8 is subject to NSWO, the UE 115-*i* and eNB 105-*a*-8 will refrain from transmitting and receiving data over the PDN Connection A with the eNB 105-*a*-8. In response to the triggering event, the UE 115-*i* may also refrain from transmitting and receiving data over other WWAN PDN connections. However, the UE 115-*i* may, in some cases, receive SIB messages from the LTE access network while refraining from transmitting and receiving data over WWAN PDN connections.

In some cases, the UE 115-*i* may determine that the LTE access network has disconnected from the UE 115-*i* while the UE 115-*i* is refraining from transmitting and receiving data over WWAN PDN connections. In these cases, the UE 115-*i* may reconnect to the given PDN connection over the LTE access network (e.g., PDN Connection A with the eNB 105-*a*-8) while the UE 115-*i* continues to refrain from transmitting and receiving data over WWAN PDN connections.

By way of example, two or three PDN connections (e.g., PDN Connections A and PDN Connection B) are shown in each of FIGS. 9A and 9B. However, in other examples, there could be any number of PDN connections for which traffic is offloaded from a WWAN access network to a WLAN access network, and any number of PDN connection with the WLAN access network. New PDN connections may also be established with the WLAN access network—either before or after the offload of all traffic of all PDN connections to the WLAN access network.

Figure 10A:
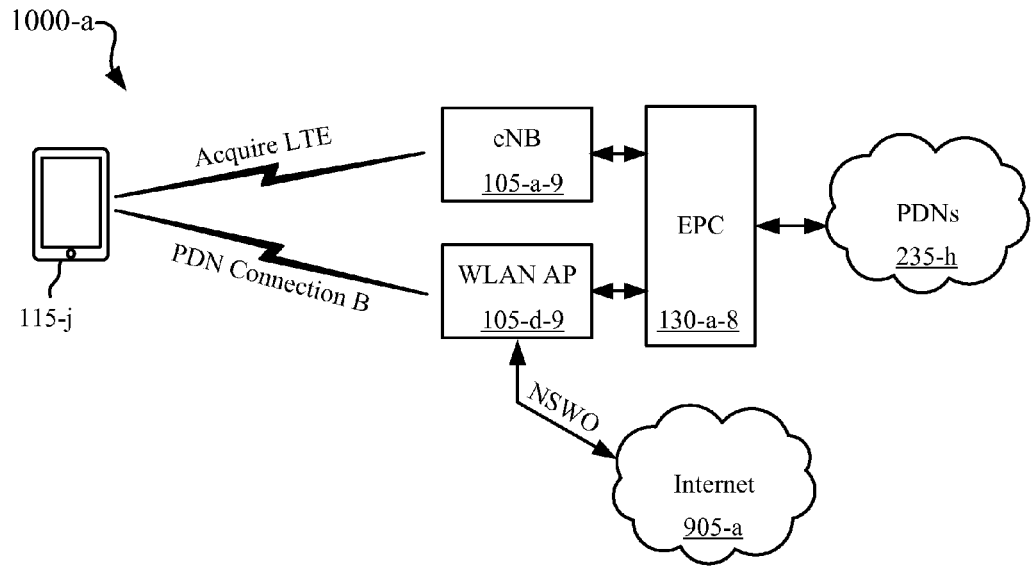
FIGS. 10A and 10B illustrate how a UE may attach to an LTE access network and connect to a PDN connection, subject to NSWO, while refraining from transmitting and receiving data over WWAN PDN connections.
Figure 10B:
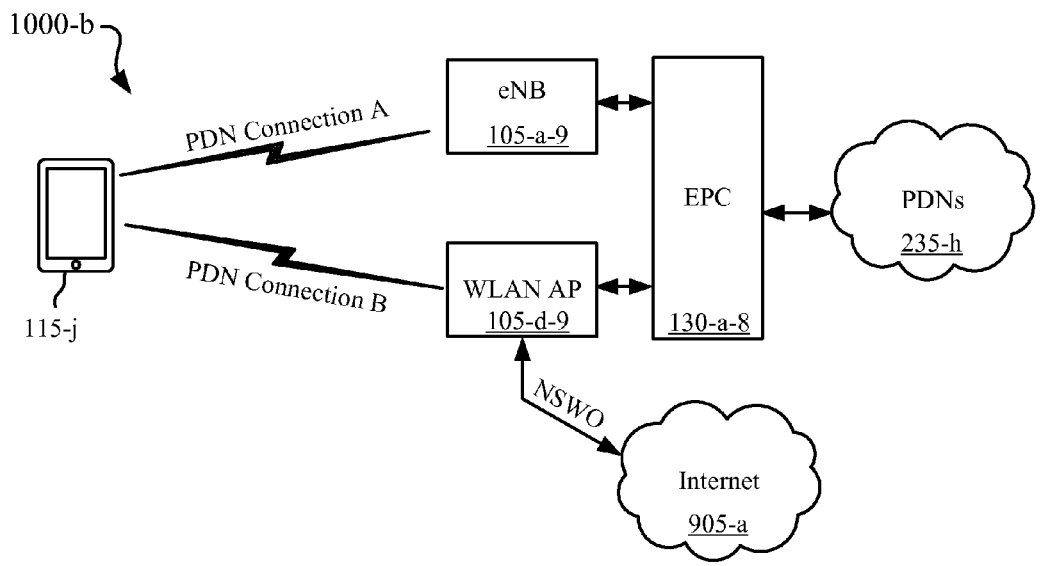

FIGS. 10A and 10B illustrate how a UE 115-*j* may attach to an LTE access network and connect to a PDN connection, subject to NSWO, while refraining from transmitting and receiving data over WWAN PDN connections. More particularly, FIG. 10A provides a diagram that illustrates a configuration of a wireless communications system 1000-*a* in which a UE 115-*j* may have PDN Connection B with a WLAN access network (e.g., with a WLAN AP 105-*d*-9 of the WLAN access network). The UE 115-*j* may also be within range of a number of WWAN access networks, such as an LTE access network represented by the eNB 105-*a*-9. Each of the eNB 105-*a*-9 and the WLAN AP 105-*d*-9 may have a connection to an EPC 130-*a*-8, which may in turn have a connection to PDNs 235-*h*. The WLAN AP 105-*d*-9 may also have a direct connection to the Internet 905-*a*. The wireless communications system, UE 115-*j*, eNB 105-*a*-9, WLAN AP 105-*d*-9, EPC 130-*a*-8, and PDNs 235-*h* may be examples of one or more aspects of the respective wireless communications system 100 or 200, UEs 115, eNBs 105-*a*, WLAN APs 105-*d*, EPC 130, and PDNs 235 described with reference to FIG. 1 and/or 2.

The Internet traffic of the UE may use NSWO over Connection B, while the LTE access network offloads all traffic of all PDN connections with the UE 115-*j* to the WLAN access network represented by the WLAN AP 105-*d*-9. At some point during operation of the wireless communications system 1000, and while the UE 115-*j* is refraining from transmitting and receiving data over WWAN PDN connections, the UE 115-*j* may attach to an LTE access network (e.g., the UE 115-*j* may attach to the eNB 105-*a*-9). In response to attaching to the LTE access network, the UE 115-*j* may connect to a PDN connection over the LTE access network if the PDN connection is subject to NSWO. Thus, as shown in the configuration of FIG. 10B, a PDN Connection A may be established between the UE 115-*j* and the eNB 105-*a*-9.

Figure 11:
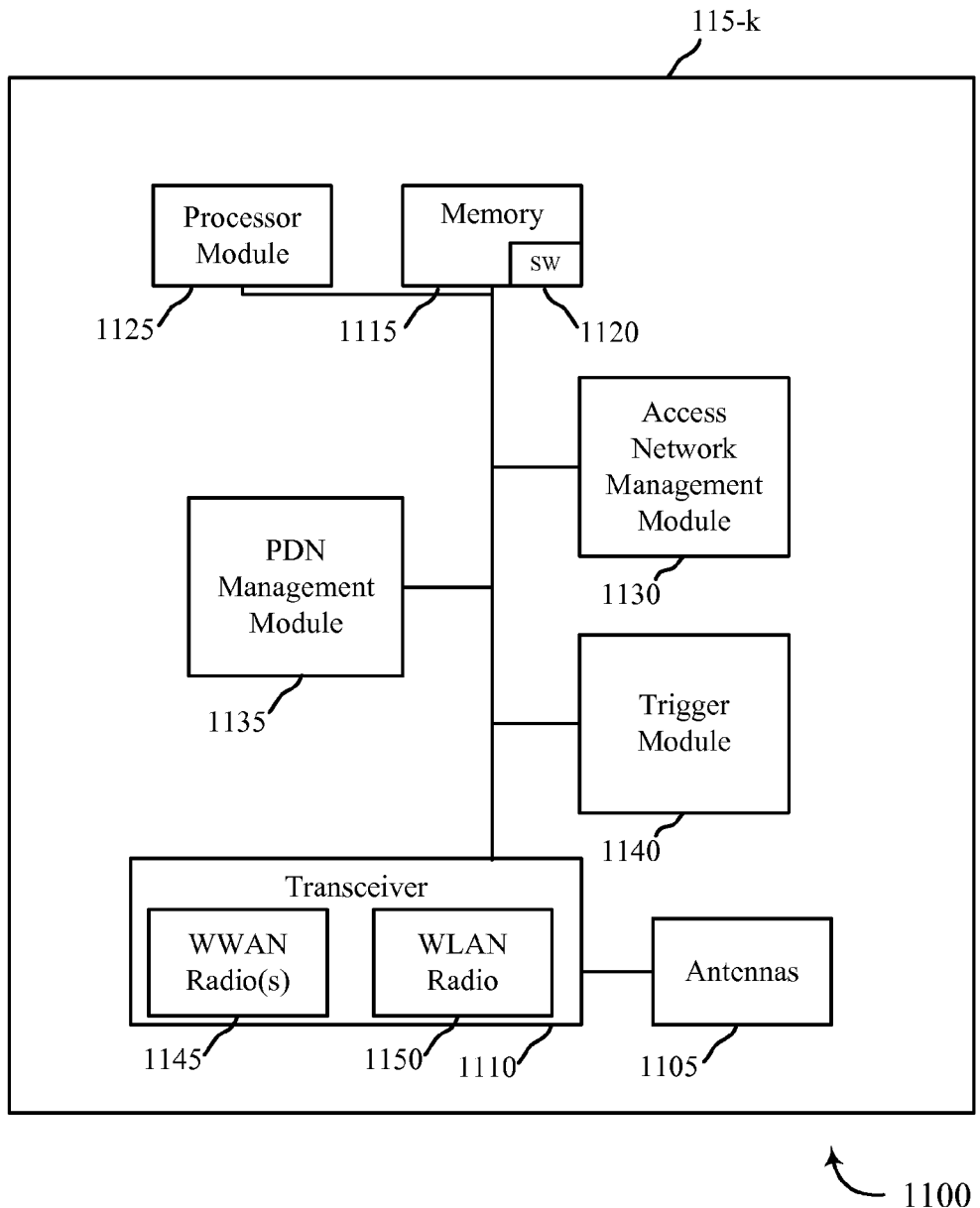
FIG. 11 is a block diagram of a UE in accordance with various embodiments.

FIG. 11 is a block diagram 1100 of a UE 115-*k*. This UE 115-*k* may be an example of any of the UEs 115 described with reference to FIG. 1, 2, 3, 4, 5, 6, 7, 8, 9, and/or 10. The UE 115-*k* may have any of various configurations, such as that of a personal computer (e.g., a laptop computer, netbook computer, tablet computer, etc.), cellular telephone, PDA, digital video recorder (DVR), internet appliance, gaming console, e-reader, etc. The UE 115-*k* may in some cases have an internal power supply (not shown), such as a small battery, to facilitate mobile operation.

The UE 115-*k* may include antennas 1105, a transceiver module 1110, memory 1115, and a processor module 1125, which each may be in communication, directly or indirectly, with each other (e.g., via one or more buses). The transceiver module 1110 may be configured to communicate bi-directionally, via the antennas 1105 and/or one or more wired or wireless links, with one or more networks, as described above. For example, the transceiver module 1110 may be configured to communicate bi-directionally with one or more of the access points 105 described with reference to FIG. 1, 2, 3, 4, 5, 6, 7, 8, 9, and/or 10. The transceiver module 1110 may include one or more modems configured to generate and modulate packets and provide the modulated packets to the antennas 1105 for transmission, and to demodulate packets received from the antennas 1105. The transceiver module 1110 may also include at least one WWAN radio 1145 and at least one WLAN radio 1150. While the UE 115-*k* may include a single antenna, the UE 115-*k* may typically include multiple antennas 1105 for multiple communications links. The WWAN and WLAN radios 1145, 1150 may enable the UE 115-*k* to support multi-access PDN connectivity (MAPCON), using different Access Point Names (APNs) over WWAN and WLAN access networks simultaneously.

The memory 1115 may include random access memory (RAM) and read-only memory (ROM). The memory 1115 may store computer-readable, computer-executable software code 1120 containing instructions that are configured to, when executed, cause the processor module 1125 to perform various functions of the 115-*k*, including various functions described herein (e.g., call processing, database management, message routing, PDN management, access network management, etc.). Alternatively, the software 1120 may not be directly executable by the processor module 1125 but be configured to cause a computer (e.g., when compiled and executed) to perform functions described herein.

The processor module 1125 may include an intelligent hardware device, e.g., a central processing unit (CPU), a microcontroller, an application specific integrated circuit (ASIC), etc. The processor module 1125 may include a speech encoder (not shown) configured to receive audio via a microphone, convert the audio into packets (e.g., 30 ms in length) representative of the received audio, provide the audio packets to the transceiver module 1110, and provide indications of whether a user is speaking. Alternatively, an encoder may only provide packets to the transceiver module 1110, with the provision or withholding/suppression of the packet itself providing the indication of whether a user is speaking.

According to the architecture of FIG. 11, the UE 115-*j* may further include an access network management module 1130, a PDN management module 1135, and a trigger module 1140. The access network management module 1130 may be configured to determine that all PDN connections of the UE 115-*k* are currently offloaded to a WLAN access network. The PDN management module 1135 may be configured to refrain from transmitting and receiving data over WWAN PDN connections while all traffic of all PDN connections of the UE 115-*k* is offloaded to the WLAN access network. The PDN management module 1135 may be further configured to establish a PDN connection with at least one of an available WWAN access network, or the WLAN access network to which PDN connections of the UE 115-$k$ are offloaded, in response to a triggering event and according to a current WWAN camping status of the UE 115-$k$ and a WLAN offload policy.

In some embodiments, the access network management module 1130 may be further configured to place the UE 115-$k$ in an LTE limited service mode, or disable LTE functionality at the UE 115-$k$, while the UE 115-$k$ is refraining from transmitting and receiving data over WWAN PDN connections.

The access network management module 1130 may also be configured, in some embodiments, to identify either or both of an LTE access network available to the UE 115-$k$ and a non-LTE WWAN access network available to the UE 115-$k$. The access network management module 1130 may then cause the UE 115-$k$ to camp on the non-LTE access network while the UE 115-$k$ refrains from transmitting and receiving data over WWAN PDN connections. An example of the operations that may be facilitated by the access network management module 1130 configuration described in this paragraph is described with reference to FIGS. 3A, 3B, and 3C.

In other embodiments, the access network management module 1130 may be configured to determine that the only WWAN access network currently available to the UE 115-$k$ is an LTE access network, and then cause the UE 115-$k$ to camp on the LTE access network while the UE 115-$k$ refrains from transmitting and receiving data over WWAN PDN connections. An example of the operations that may be facilitated by the access network management module 1130 configuration described in this paragraph is described with reference to FIGS. 4A, 4B, and 4C.

The PDN management module 1135 may in some cases be configured to determine that a given PDN connection of the UE 115-$k$ is subject to NSWO, and then based on this determination, cause the UE 115-$k$ to remain attached to the given PDN connection. The UE 115-$k$ may remain attached to the given PDN connection through an LTE access network, while the UE 115-$k$ continues to refrain from transmitting and receiving data over WWAN PDN connections. In some embodiments, the access network management module 1130 may be further configured to acquire service over the LTE access network while the UE 115-$k$ is refraining from transmitting and receiving data over WWAN PDN connections, and the PDN management module 1135 may be further configured to establish the given PDN connection with the LTE access network, in response to the access network management module 1130 acquiring service over the LTE access network, and while the UE 115-$k$ continues to refrain from transmitting and receiving data over WWAN PDN connections. In other embodiments, the access network management module 1130 may be further configured to determine that the LTE access network has disconnected from the UE 115-$k$ while the UE 115-$k$ is refraining from transmitting and receiving data over WWAN PDN connections, and the PDN management module 1135 may be further configured to reconnect the given PDN connection with the LTE access network while the UE 115-$k$ is refraining from transmitting and receiving data over WWAN PDN connections. Examples of the operations that may be facilitated by the access network management module 1130 and PDN management module 1135 configurations described in this paragraph are described with reference to FIGS. 9A, 9B, 10A, and 10B.

The trigger module 1140 may be configured to detect a triggering event. In some cases, the triggering event may include a decision made by the access network management module 1130 of the UE 115-$k$, which may be a decision that a WLAN access network is preferred over a WWAN access network (e.g., an LTE access network). In other cases, the triggering event may include a PDN disconnection procedure initiated by a WWAN access network (e.g., a PDN disconnection procedure initiated by an LTE access network for the last PDN connection of the UE 115-$k$ with the LTE access network). In still other cases, the triggering event may be include activity (e.g., a request) of an application running on the UE 115-$k$, which application causes the UE 115-$k$ to initiate PDN disconnection procedures for the last PDN connection of the UE 115-$k$ on an EPC-capable radio access technology (RAT) other than LTE (e.g., eHRPD).

By way of example, the module 1130, 1135, and/or 1140 may be a component of the UE 115-$k$ in communication with some or all of the other components of the UE 115-$k$ via a bus. Alternatively, functionality of the module 1130, 1135, and/or 1140 may be implemented as a component of the transceiver module 1110, as a computer program product, and/or as one or more controller elements of the processor module 1125.

The components of the UE 115-$k$ may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UE 115-$j$.

Figure 12:
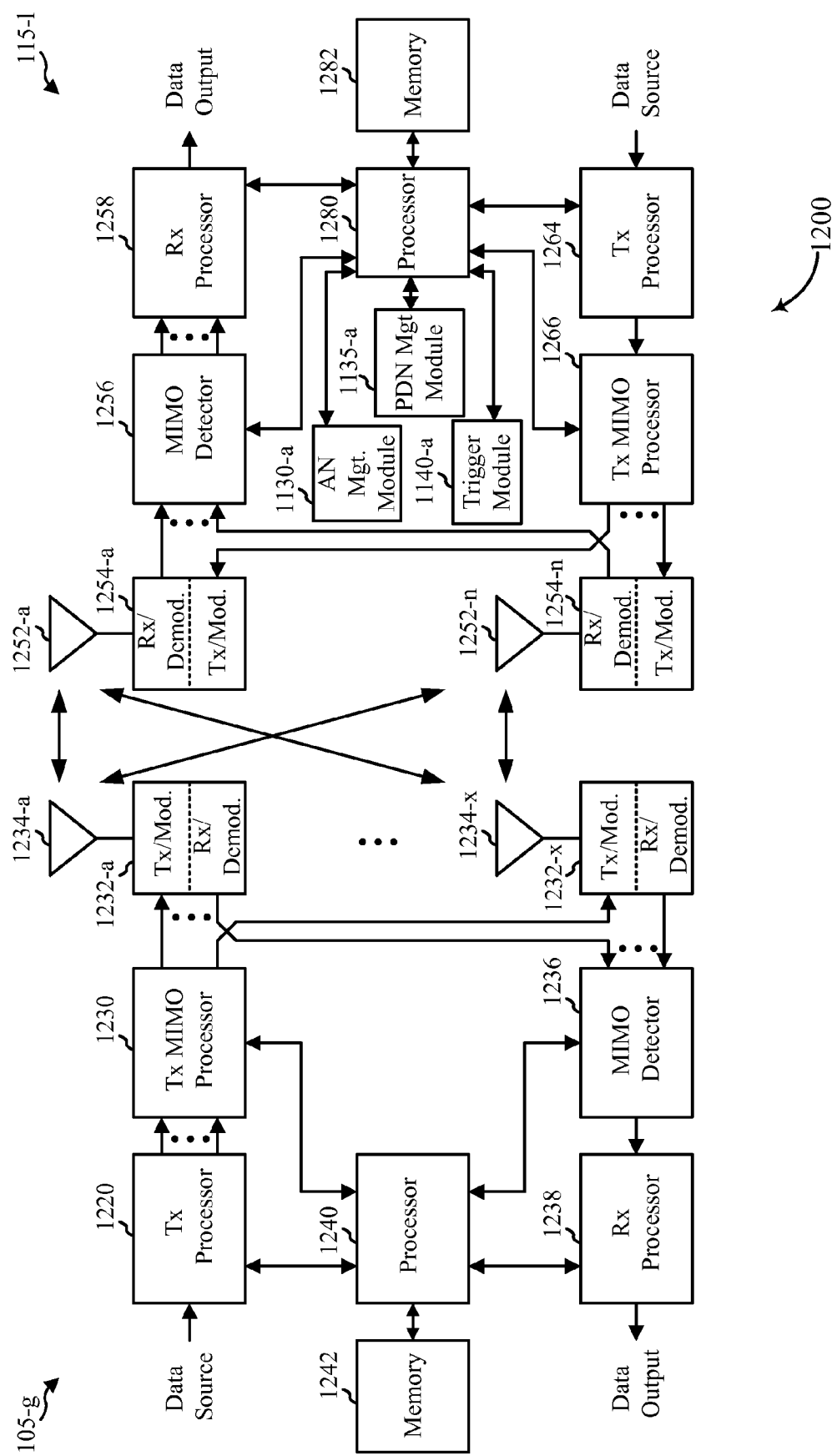
FIG. 12 is a block diagram of a MIMO communication system in accordance with various embodiments.

FIG. 12 is a block diagram of a MIMO communication system 1200 including a BTS 105-$g$ and a UE 115-$k$. The MIMO communication system 1200 may illustrate aspects of the wireless communications system (e.g., wireless communications system 100 or 200) shown in FIG. 1, 2, 3, 4, 5, 6, 7, 8, 9, and or 10. The access point 105-$g$ may be equipped with antennas 1234-$a$ through 1234-$x$, and the UE 115-1 may be equipped with antennas 1252-$a$ through 1252-$n$. In the MIMO communications system 1200, the access point 105-$g$ may be able to send data over multiple communication links at the same time. Each communication link may be called a "layer" and the "rank" of the communication link may indicate the number of layers used for communication. For example, in a 2×2 MIMO communications system where access point 105-$g$ transmits two "layers," the rank of the communication link between the access point 105-$g$ and the UE 115-1 is two.

At the access point 105-$g$, a transmit processor 1220 may receive data from a data source. The transmit processor 1220 may process the data. The transmit processor 1220 may also generate control symbols and/or reference symbols. A transmit (TX) MIMO processor 1230 may perform spatial processing (e.g., precoding) on data symbols, control symbols, and/or reference symbols, if applicable, and may provide output symbol streams to the transmit modulators 1232-$a$ through 1232-$x$. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a DL signal. In one example, DL signals from modulators 1232-*a* through 1232-*x* may be transmitted via the antennas 1234-*a* through 1234-*x*, respectively.

At the UE 115-1, the UE antennas 1252-*a* through 1252-*n* may receive the DL signals from the access point 105-*g* and may provide the received signals to the demodulators 1254-*a* through 1254-*n*, respectively. Each demodulator 1254 may condition (e.g., filter, amplify, downconvert, and digitize) a respective received signal to obtain input samples. Each demodulator 1254 may further process the input samples (e.g., for OFDM, etc.) to obtain received symbols. A MIMO detector 1256 may obtain received symbols from all the demodulators 1254-*a* through 1254-*n*, perform MIMO detection on the received symbols, if applicable, and provide detected symbols. A receive processor 1258 may process (e.g., demodulate, deinterleave, and decode) the detected symbols, providing decoded data for the UE 115-1 to a data output, and provide decoded control information to a processor 1280, or memory 1282.

The processor 1280 may in some cases execute stored instructions to instantiate one or more of an access network management module 1130-*a*, a PDN management module 1135-*a*, and/or a trigger module 1140-*a*. The modules 1130-*a*, 1135-*a*, and 1140-*a* may be examples of aspects of the respective modules 1130, 1135, and 1140 described with reference to FIG. 12.

On the uplink (UL), at the UE 115-1, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the demodulators 1254-*a* through 1254-*n* (e.g., for SC-FDMA, etc.), and be transmitted to the access point 105-*g* in accordance with the transmission parameters received from the access point 105-*g*. At the access point 105-*g*, the UL signals from the UE 115-1 may be received by the antennas 1234, processed by the demodulators 1232, detected by a MIMO detector 1236 if applicable, and further processed by a receive processor 1238. The receive processor 1238 may provide decoded data to a data output and to the processor 1240 and/or memory 1242.

The components of the UE 115-1 may, individually or collectively, be implemented with one or more Application Specific Integrated Circuits (ASICs) adapted to perform some or all of the applicable functions in hardware. Each of the noted modules may be a means for performing one or more functions related to operation of the MIMO communications system 1200. Similarly, the components of the access point 105-*g* may, individually or collectively, be implemented with one or more Application Specific Integrated Circuits (ASICs) adapted to perform some or all of the applicable functions in hardware. Each of the noted components may be a means for performing one or more functions related to operation of the MIMO communications system 1200.

Figure 13:
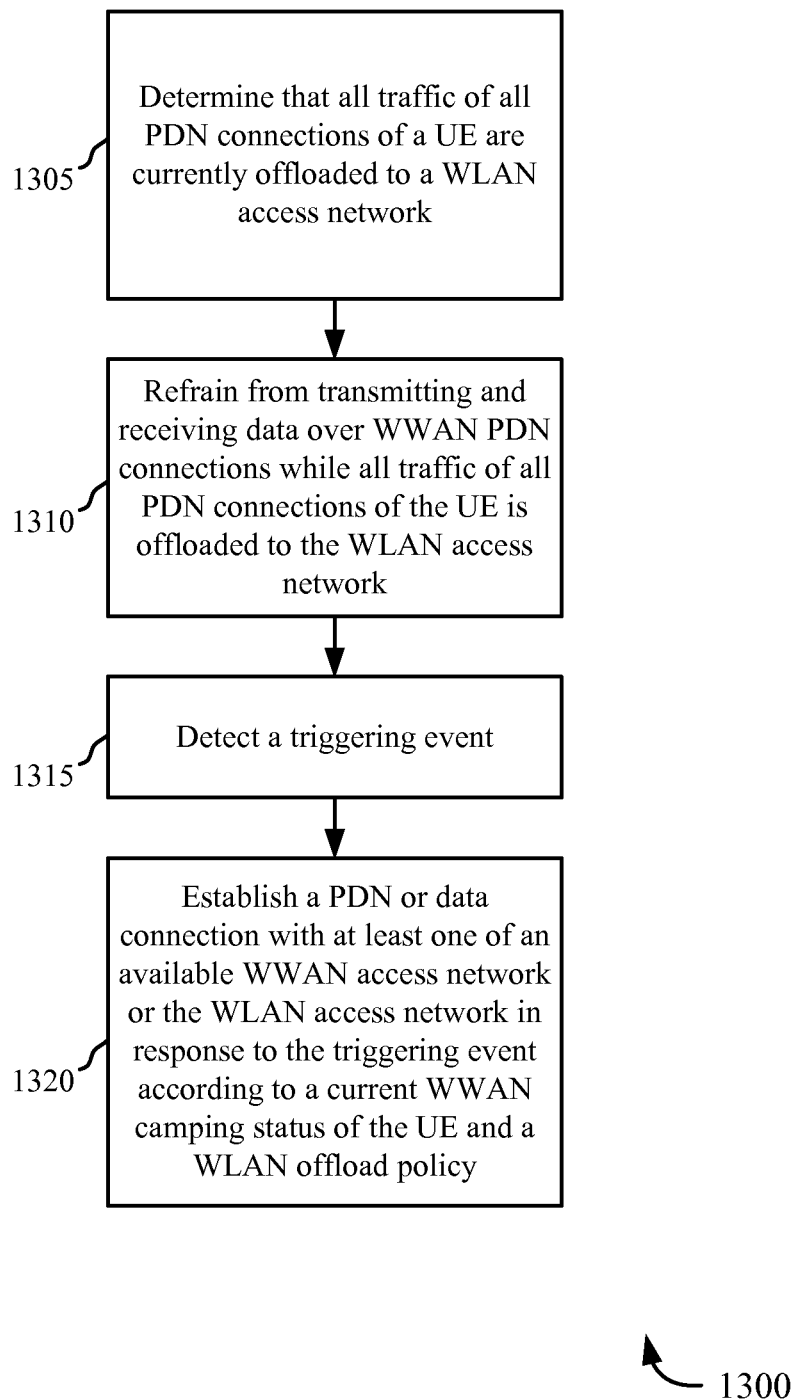
FIG. 13 is a flow chart illustrating a first embodiment of a method for managing data connectivity at a UE, in accordance with various embodiments.

FIG. 13 is a flow chart illustrating an embodiment of a method 1300 for managing data connectivity at a UE. For clarity, the method 1300 is described below with reference to the wireless communications system 100, 200, and/or 1200 shown in FIG. 1, 2, and/or 12, and/or with reference to one of the UEs 115 described with reference to FIG. 1, 2, 3, 4, 5, 6, 7, 8, 9, 10, 11, and/or 12. In one implementation, a UE 115 may execute one or more sets of codes to control the functional elements of a device to perform the functions described below.

At block 1305, all traffic of all PDN connections of a UE 115 may be determined to be currently offloaded to a WLAN access network. The determination at block 1305 may in some cases be made by the access network management module 1130 described with reference to FIG. 11.

At block 1310, the UE 115 may refrain from transmitting and receiving data over WWAN PDN connections while all traffic of all PDN connections of the UE 115 is offloaded to the WLAN access network. Refraining from transmitting and receiving data over WWAN PDN connections may in some cases include, for example, placing the UE 115 in an LTE limited service mode or disabling LTE functionality at the UE 115. The operations at block 1310 may in some cases be managed by the PDN management module 1135 described with reference to FIG. 11.

At block 1315, a triggering event may be detected. In some cases, the triggering event may include a determination to transfer an existing PDN connection from the WLAN access network to the available WWAN access network (e.g., because WLAN access has deteriorated to an unacceptable level; because an application requests that a handover of an existing PDN connection be made to WWAN; or because the UE's access network management module (e.g., module 1130 of FIG. 11) determines that WWAN is preferred over WLAN because, for example, the condition of a RAT changes). In other cases, the triggering event may include a request received at the UE 115 to establish a new data connection supported by only WWAN access networks. In still other cases, the triggering event may include an application request to establish a new PDN connection for which WWAN has a higher priority than WLAN. In some embodiments, the operations at block 1315 may be performed by the trigger module 1140 described with reference to FIG. 11.

At block 1320, a PDN or data connection may be established with at least one of an available WWAN access network or the WLAN access network, in response to the triggering event and according to a current WWAN camping status of the UE and a WLAN offload policy. The operations at block 1320 may also, in some cases, be managed by the PDN management module 1135 described with reference to FIG. 11.

Therefore, the method 1300 may be used to manage data connectivity at a UE 115. It should be noted that the method 1300 is just one implementation and that the operations of the method 1300 may be rearranged or otherwise modified such that other implementations are possible.

Figure 14A:
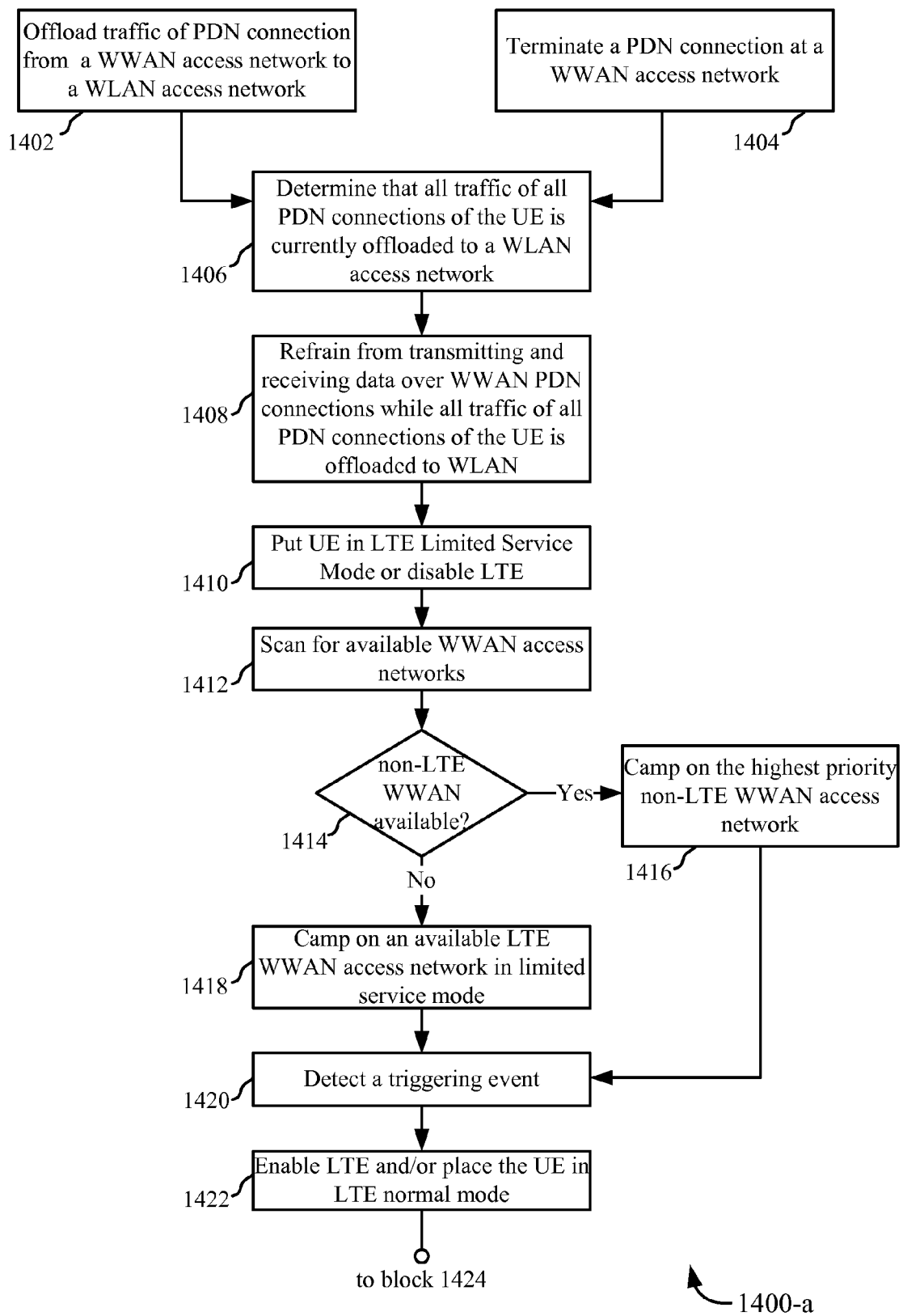
FIGS. 14A and 14B are a flow chart illustrating a second embodiment of a method for managing data connectivity at a UE, in accordance with various embodiments.
Figure 14B:
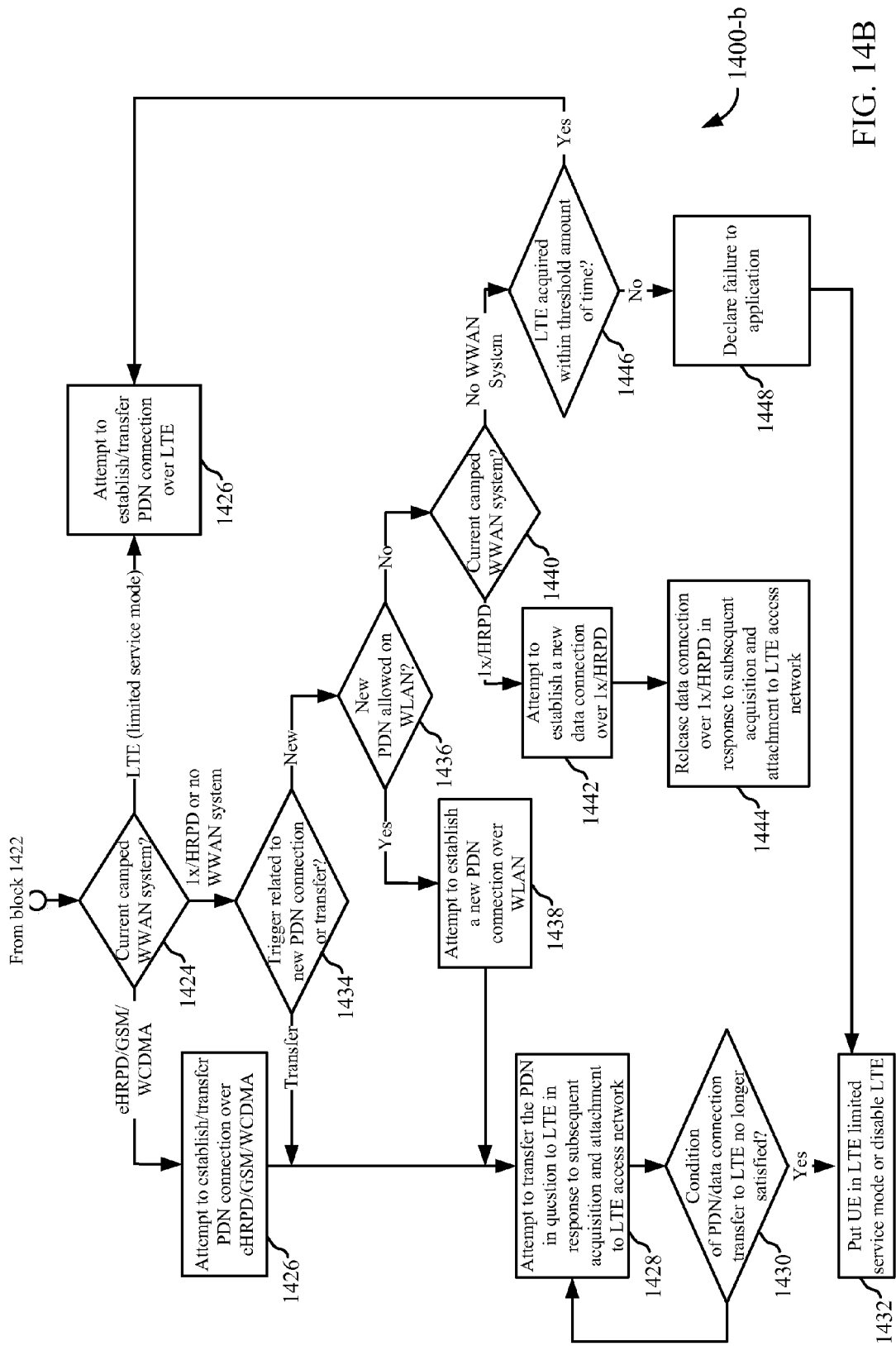

FIGS. 14A and 14B are a flow chart illustrating an embodiment of a method 1400 for managing data connectivity at a UE. For clarity, the method 1400 is described below with reference to the wireless communications system 100, 200, and/or 1200 shown in FIG. 1, 2, and/or 12, and/or with reference to one of the UEs 115 described with reference to FIG. 1, 2, 3, 4, 5, 6, 7, 8, 11, and/or 12. In one implementation, a UE 115 may execute one or more sets of codes to control the functional elements of a device to perform the functions described below.

Beginning at FIG. 14A, at block 1402, one or more PDN connections of a UE 115 may be offloaded from a WWAN access network (e.g., an LTE access network) to a WLAN access network. In some cases, the PDN connections of the UE 115 may be offloaded in response to a triggering event. In some cases, the triggering event may include a decision by an access network management module (e.g., module 1135) of the UE 115 that a WLAN access network is preferred over the WWAN access network. In other cases, the triggering event may include a PDN disconnection procedure initiated by the LTE access network for the last PDN connection of the UE 115 with the LTE access network. In still other cases, the triggering event may be include activity (e.g., a request) of an application running on the UE 115, which application causes the UE 115 to initiate PDN disconnection procedures for the last PDN connection of the UE 115 on an EPC-capable radio access technology (RAT) other than LTE (e.g., eHRPD). The operations at block 1402 may in some cases be performed by the access network management module 1130 described with reference to FIG. 11.

When traffic of all PDN connections is offloaded from an eHRPD access network, for example, the UE 115 may initiate Point-to-Point Protocol (PPP) release procedures over eHRPD after the Practical Context Maintenance Timer, if started, has expired. When traffic of all PDN connections is offloaded from an LTE access network, for example, the UE 115 may in some cases transition to an LTE Deregistered state.

At block 1404, in addition to or instead of the traffic offloading at block 1402, one or more PDN connections of the UE 115 may be terminated at a WWAN access network. The operations at block 1404 may in some cases be performed by the PDN management module 1135 described with reference to FIG. 11.

In response to the offloading at block 1402 and/or the connection termination at block 1404, at block 1406, all traffic of all PDN connections of the UE 115 may be determined to be currently offloaded to a WLAN access network. The determination at block 1406 may in some cases be made by the access network management module 1130 described with reference to FIG. 11.

At block 1408, the UE 115 may refrain from transmitting and receiving data over WWAN PDN connections while all traffic of all PDN connections of the UE 115 is offloaded to the WLAN access network. Refraining from transmitting and receiving data over WWAN PDN connections may in some cases include, for example, placing the UE 115 in an LTE limited service mode or disabling LTE functionality at the UE 115. The operations at block 1408 may in some cases be managed by the PDN management module 1135 described with reference to FIG. 11. At block 1410, the UE may be put in an LTE limited service mode, as described above, or LTE functionality may be disabled at the UE.

At block 1412, the UE 115 may scan for available WWAN access networks and identify, for example, one or more of an LTE access network available to the UE 115, if any, and a non-LTE WWAN access network available to the UE 115, if any. When it is determined at block 1414 that a non-LTE WWAN access network is available, the UE 115 may camp on the highest priority non-LTE WWAN access network at block 1416. When it is determined at block 1414 that a non-LTE WWAN access network is not available, the UE 115 may camp on an available LTE access network, if any, at block 1418. The UE 115 may camp on the available LTE access network in a LTE limited service mode. Alternatively, the UE 115 may disable LTE.

At block 1420, another triggering event may be detected. In some cases, the triggering event may include a determination to transfer an existing PDN connection from the WLAN access network to the available WWAN access network (e.g., because WLAN access has deteriorated to an unacceptable level; because an application requests that a handover of an existing PDN connection be made to WWAN; or because the UE's access network management module (e.g., module 1130 of FIG. 11) determines that WWAN is preferred over WLAN because, for example, the condition of a RAT changes). In other cases, the triggering event may include a request received at the UE 115 to establish a new data connection supported by only WWAN access networks. In still other cases, the triggering event may include an application request to establish a new PDN connection for which WWAN has a higher priority than WLAN. In some embodiments, the operations at block 1420 may be performed by the trigger module 1140 described with reference to FIG. 11.

At block 1422, and in response to the second triggering event, the UE 115 may enable LTE functionality or place itself in an LTE normal mode from the LTE limited service mode. In the LTE normal mode, the UE 115 may scan for and attempt to attach to an LTE access network (if not already attached to an LTE access network in an LTE limited service mode).

Continuing to FIG. 14B, at block 1424, following the enabling of LTE and/or placing the UE in LTE normal mode, a determination may be made at block 1424 as to whether the UE is camped on an EPC-capable non-LTE WWAN access network (e.g., EHRPD/GSM/WCDMA), a 1x/HRPD WWAN access network, an LTE WWAN access network, or no WWAN access network while refraining from transmitting and receiving data over WWAN PDN connections. In the case where the UE is camped on an EPC-capable non-LTE WWAN access network, the UE may attempt at block 1426 to establish or transfer the PDN connection(s) in question to the EPC-capable non-LTE WWAN access network. In response to a subsequent acquisition and attachment to an LTE WWAN access network, the UE may attempt to transfer the PDN in question to the LTE WWAN access network at block 1428. A determination may then be made at block 1430 of whether a condition associated with transferring the PDN connection to LTE is no longer satisfied. If the condition is no longer satisfied, the UE may be placed in LTE limited service mode or LTE functionality may be disabled at the UE for a time.

Returning to the decision at block 1424, if it is determined that the UE is currently camped on a non-EPC-capable non-LTE WWAN system (e.g., a 1x/HRPD WWAN system) or on no WWAN system, the UE may determine at block 1434 whether the trigger event of block 1420 relates to the transfer of one or more PDN connections to LTE or to a new PDN connection. If the trigger relates to the transfer of one or more PDN connections to LTE (block 1434, YES), flow may proceed to the aforementioned functionality described with respect to blocks 1428, 1430, and 1432. If the triggering event instead relates to establishing one or more new PDN connections (block 1434, No), flow may proceed to block 1436, where the UE determines whether the new PDN connection(s) are allowed on the WLAN access network.

In the event that the new PDN connection(s) are allowed on the WLAN access network (block 1436, Yes), the UE may attempt to establish the new PDN connection over WLAN at block 1438, and the UE may attempt to transfer the new PDN to LTE in response to the UE's subsequent acquisition and attachment to an LTE access network. If the new PDN connection(s) are not allowed on the WLAN access network (block 1436, No), a determination may be made at block 1440 of whether the UE is currently camped on a non-EPC-capable non-LTE 1x/HRPD WWAN access network or no WWAN access network at all.

If the UE is currently camped on the non-EPC-capable non-LTE 1x/HRPD WWAN access network, the UE may attempt to establish a new data connection over 1x/HRPD at block 1442, and release the data connection over 1x/HRPD at block 1444 in response to the subsequent acquisition and attachment to an LTE access network by the UE. On the other hand, if the UE is not currently camped on a WWAN access network, the UE may determine at block 1446 whether an LTE access network has been acquired and attached to within a configured threshold amount of time. If so (block 1446, Yes), the UE may attempt to establish or transfer the PDN connection in question over LTE at block 1426. Otherwise (block 1446, No), the UE may declare failure to the application at block 1448, and return to LTE limited service mode or disable LTE functionality at block 1432.

Returning to the decision at block 1424, if it is determined that the UE is currently camped on an LTE WWAN access network in limited service mode, the UE may attempt to reattach to the LTE WWAN access network and attempt to establish or transfer the PDN connection in question over LTE, according to the triggering event. The operations at blocks 1424, 1430, 1440, and 1446 may in some cases be performed by the access network management module 1130 described with reference to FIG. 11. The operations at blocks 1426, 1428, 1432, 1436, 1438, 1442, 1444, 1446, and 1448 may in some cases be performed by the PDN management module 1135 described with reference to FIG. 11. The operations at block 1434 may in some cases be performed by the trigger module 1140 described with reference to FIG. 11.

Therefore, the method 1400 may be used to manage data connectivity at a UE 115. It should be noted that the method 1400 is just one implementation and that the operations of the method 1400 may be rearranged or otherwise modified such that other implementations are possible.

Figure 15:
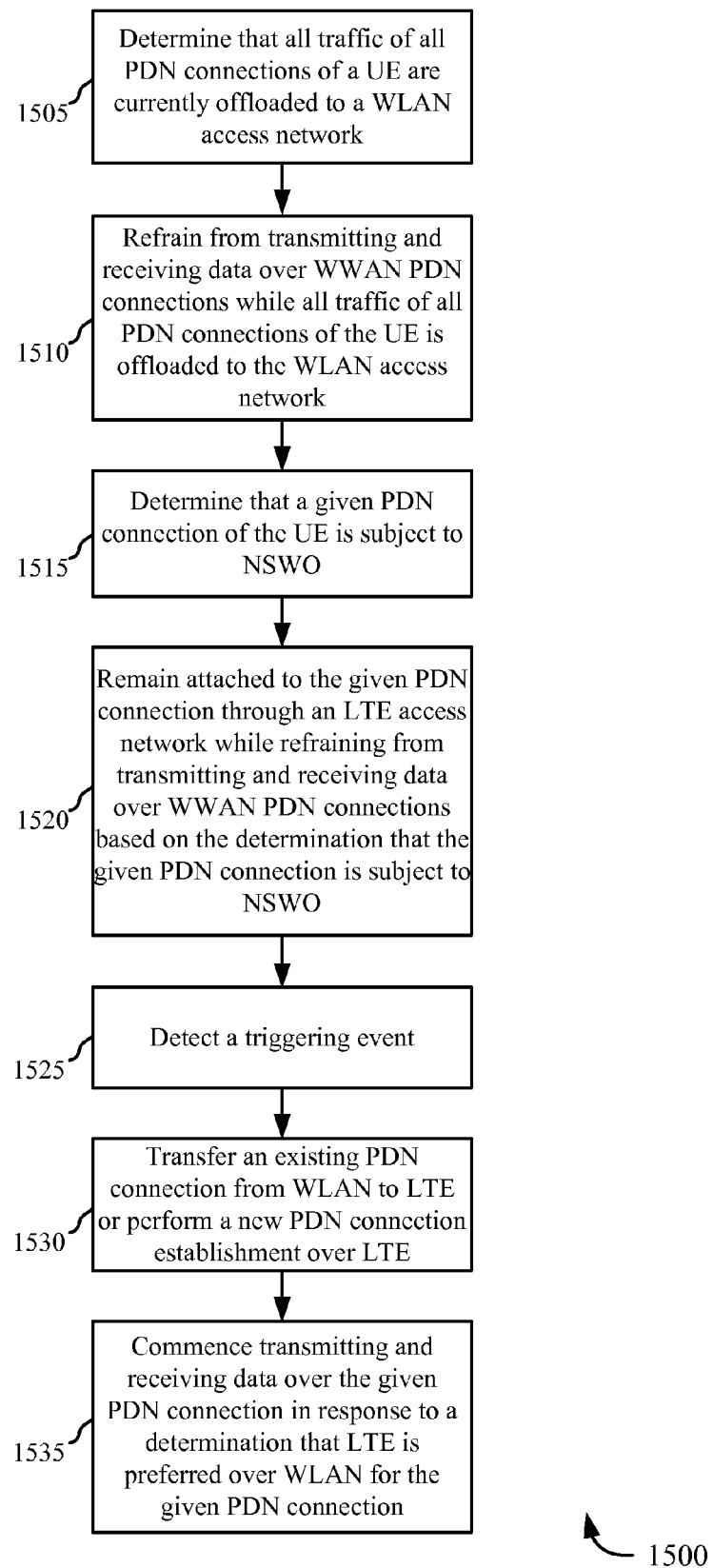
FIG. 15 is a flow chart illustrating a third embodiment of a method for managing data connectivity at a UE, in accordance with various embodiments.

FIG. 15 is a flow chart illustrating an embodiment of a method 1500 for managing data connectivity at a UE. For clarity, the method 1500 is described below with reference to the wireless communications system 100, 200, and/or 1200 shown in FIG. 1, 2, and/or 12, and/or with reference to one of the UEs 115 described with reference to FIG. 1, 2, 9, 10, 11, and/or 12. In one implementation, a UE 115 may execute one or more sets of codes to control the functional elements of a device to perform the functions described below.

At block 1505, all traffic of all PDN connections of a UE 115 may be determined to be currently offloaded to a WLAN access network. The determination at block 1505 may in some cases be made by the access network management module 1130 described with reference to FIG. 11.

At block 1510, the UE 115 may refrain from transmitting and receiving data over WWAN PDN connections while all traffic of all PDN connections of the UE 115 is offloaded to the WLAN access network. The operations at block 1510 may in some cases be managed by the PDN management module 1135 described with reference to FIG. 11.

At block 1515, the UE 115 may determine that a given PDN connection of the UE 115 is subject to NSWO. The determination at block 1515 may in some cases be made by the access network management module 1130 described with reference to FIG. 11.

At block 1520, and based on the determination that the given PDN connection is subject to NSWO, the UE 115 may remain attached to the given PDN connection over an LTE access network while refraining from transmitting and receiving data over WWAN PDN connections. However, in some cases, the UE 115 may only remain attached to the given PDN connection upon further determining that the given PDN connection is a last PDN connection of the UE established over the LTE access network.

At block 1525, a triggering event may be detected. In some cases, the triggering event may include a determination to transfer an existing PDN connection from the WLAN access network to the available WWAN access network (e.g., because WLAN access has deteriorated to an unacceptable level; because an application requests that a handover of an existing PDN connection be made to WWAN; or because the UE's access network management module (e.g., module 1130 of FIG. 11) determines that WWAN is preferred over WLAN because, for example, the condition of a RAT changes). In other cases, the triggering event may include a request received at the UE 115 to establish a new data connection supported by only WWAN access networks. In still other cases, the triggering event may include an application request to establish a new PDN connection for which WWAN has a higher priority than WLAN. In some embodiments, the operations at block 1525 may be performed by the trigger module 1140 described with reference to FIG. 11.

At block 1530, the UE may transfer an existing PDN connection from WLAN to LTE or perform a new PDN connection establishment over LTE in response to the triggering event and according to a current WWAN camping status of the UE and a WLAN offload policy. At block 1535, the UE may commence transmitting and receiving data over the PDN connection subject to NSWO via the LTE access network if the UE determines that the LTE access network is preferred over the WLAN access network for this PDN connection. The operations at blocks 1530 and 1535 may, in some cases, be managed by the PDN management module 1135 described with reference to FIG. 11.

In some cases, the PDN connection subject to NSWO may be lost before the triggering event occurs. In these cases, the UE 115 may attempt to restore the PDN connection subject to NSWO. For example, the UE 115 may determine that the LTE access network has disconnected from the UE 115 while the UE 115 is refraining from transmitting and receiving data over WWAN PDN connections. In such a case, the UE 115 may reconnect (or attempt to reconnect) to the PDN connection subject to NSWO while continuing to refrain from transmitting and receiving data over WWAN PDN connections (including refraining from transmitting and receiving data over the PDN connection subject to NSWO).

Therefore, the method 1500 may be used to manage data connectivity at a UE 115. It should be noted that the method 1500 is just one implementation and that the operations of the method 1500 may be rearranged or otherwise modified such that other implementations are possible.

Figure 16:
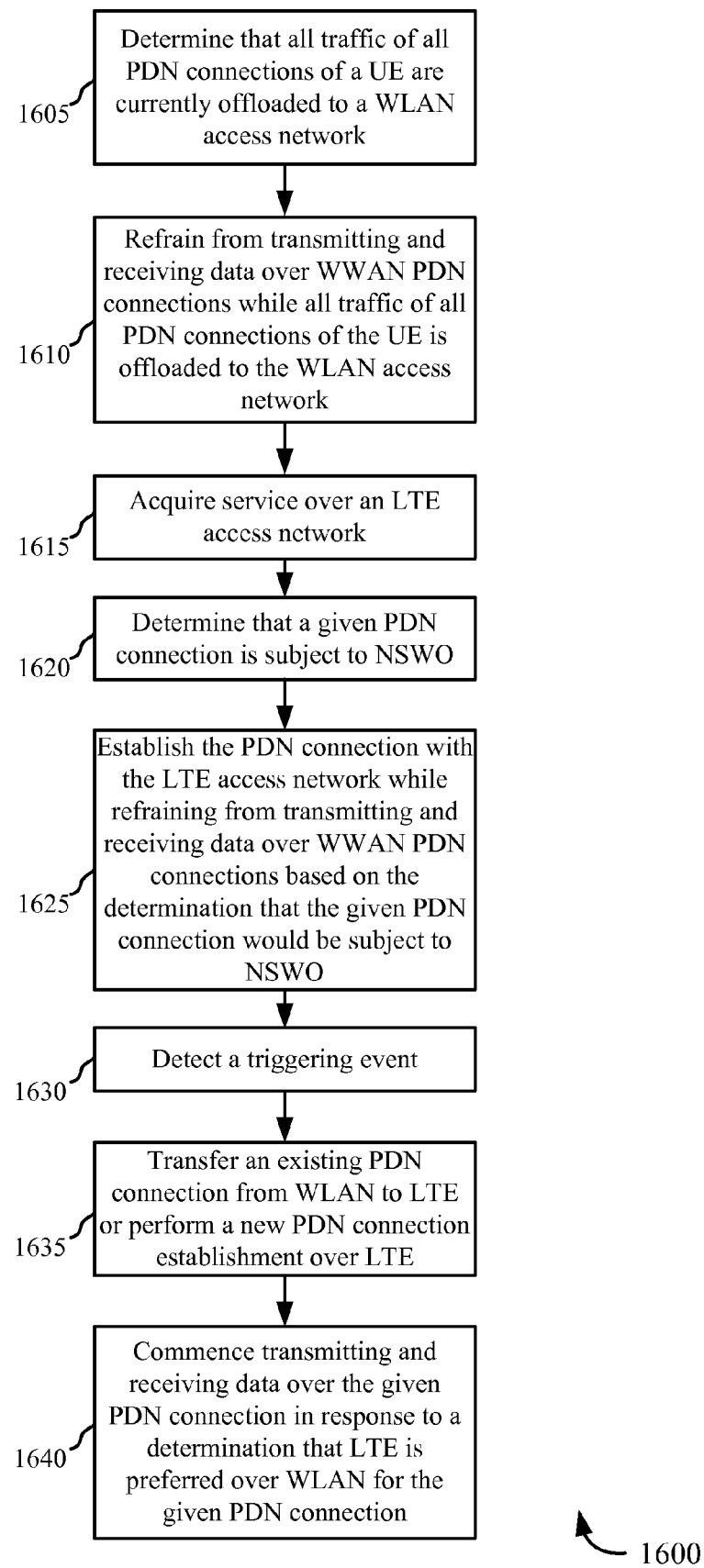
FIG. 16 is a flow chart illustrating a fourth embodiment of a method for managing data connectivity at a UE, in accordance with various embodiments.

FIG. 16 is a flow chart illustrating another embodiment of a method 1500 for managing data connectivity at a UE. For clarity, the method 1500 is described below with reference to the wireless communications system 100, 200, and/or 1200 shown in FIG. 1, 2, and/or 12, and/or with reference to one of the UEs 115 described with reference to FIG. 1, 2, 9, 10, 11, and/or 12. In one implementation, a UE 115 may execute one or more sets of codes to control the functional elements of a device to perform the functions described below.

At block 1605, all traffic of all PDN connections of a UE 115 may be determined to be currently offloaded to a WLAN access network. The determination at block 1605 may in some cases be made by the access network management module 1130 described with reference to FIG. 11.

At block 1610, the UE 115 may refrain from transmitting and receiving data over WWAN PDN connections while all traffic of all PDN connections of the UE 115 is offloaded to the WLAN access network. Refraining from transmitting and receiving data over WWAN PDN connections may in some cases include, for example, placing the UE 115 in an LTE limited service mode or disabling LTE functionality at the UE 115. The operations at block 1610 may in some cases be managed by the PDN management module 1135 described with reference to FIG. 11.

At block 1615, and while continuing to refrain from transmitting and receiving data over WWAN PDN connections, the UE 115 may acquire service over an LTE access network.

At block 1620, the UE 115 may determine that a given PDN connection would be subject to NSWO. At block 1625, and based on the determination that the given PDN connection would be subject to NSWO, the UE 115 may establish the given PDN connection with the LTE access network. While doing so, the UE 115 may continue to refrain from transmitting and receiving data over WWAN PDN connections. The operations at blocks 1620 and 1625 may in some cases be made by the access network management module 1130 described with reference to FIG. 11.

At block 1630, a triggering event may be detected. In some cases, the triggering event may include a determination to transfer an existing PDN connection from the WLAN access network to the available WWAN access network (e.g., because WLAN access has deteriorated to an unacceptable level; because an application requests that a handover of an existing PDN connection be made to WWAN; or because the UE's access network management module (e.g., module 1130 of FIG. 11) determines that WWAN is preferred over WLAN because, for example, the condition of a RAT changes). In other cases, the triggering event may include a request received at the UE 115-e to establish a new data connection supported by only WWAN access networks. In still other cases, the triggering event may include an application request to establish a new PDN connection for which WWAN has a higher priority than WLAN. In some embodiments, the operations at block 1630 may be performed by the trigger module 1140 described with reference to FIG. 11.

At block 1635, the UE may transfer an existing PDN connection from WLAN to LTE or perform a new PDN connection establishment over LTE in response to the triggering event and according to a current WWAN camping status of the UE and a WLAN offload policy. At block 1640, the UE may commence transmitting and receiving data over the PDN connection subject to NSWO via the LTE access network if the UE determines that the LTE access network is preferred over the WLAN access network for this PDN connection. The operations at blocks 1635 and 1640 may, in some cases, be managed by the PDN management module 1135 described with reference to FIG. 11.

Therefore, the method 1600 may be used to manage data connectivity at a UE 115. It should be noted that the method 1600 is just one implementation and that the operations of the method 1600 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with at least one general-purpose processor, at least one digital signal processor (DSP), at least one application specific integrated circuit (ASIC), at least one field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., at least one processor, a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or computer-readable program code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of managing data connectivity at a user equipment (UE), comprising:
   determining that all traffic of all packet data network (PDN) connections of the UE is currently offloaded to a Wireless Local Area Network (WLAN) access network;
   refraining from transmitting and receiving data over Wireless Wide Area Network (WWAN) PDN connections while all traffic of all PDN connections of the UE is offloaded to the WLAN access network;
   determining that an only WWAN access network currently available to the UE is an LTE access network;
   camping, based on the determining that the only WWAN access network currently available is an LTE access network, on the LTE access network and receiving system information block messages from the LTE access network while refraining from transmitting and receiving data over the WWAN PDN connections;
   detecting a triggering event; and
   establishing a PDN connection with at least one of an available WWAN access network or the WLAN access network in response to the triggering event according to a current WWAN camping status of the UE and a WLAN offload policy.

2. The method of claim 1, wherein the refraining from transmitting and receiving data over WWAN PDN connections comprises at least one of placing the UE in a Long Term Evolution (LTE) limited service mode or disabling LTE functionality at the UE.

3. The method of claim 2, further comprising:
   identifying an LTE access network available to the UE and a non-LTE WWAN access network available to the UE; and
   switching to camping on the non-LTE WWAN access network instead of the LTE access network while refraining from transmitting and receiving data over WWAN PDN connections.

4. The method of claim 2, wherein the triggering event comprises:
   a determination to transfer an existing PDN connection from the WLAN access network to the available WWAN access network.

5. The method of claim 4, further comprising:
   switching to camping on an evolved packet core (EPC)-capable non-LTE WWAN access network instead of the LTE access network while refraining from transmitting and receiving data over WWAN PDN connections;
   transferring the existing PDN connection of the UE to the EPC-capable non-LTE WWAN access network in response to the triggering event;
   performing, in response to the triggering event, at least one of: enabling LTE functionality or placing the UE in an LTE normal mode; and
   transferring the existing PDN connection of the UE from the EPC-capable non-LTE WWAN access network to an LTE access network in response to the UE attaching to the LTE access network or entering the LTE normal mode.

6. The method of claim 4, further comprising:
   determining that the UE is camped on an LTE access network in a limited service mode while refraining from transmitting and receiving data over WWAN PDN connections or that the UE has disabled LTE functionality and is not camping on any WWAN access network while refraining from transmitting and receiving data over WWAN PDN connections;
   performing, in response to the triggering event, at least one of: enabling LTE functionality or placing the UE in an LTE normal mode; and
   transferring the existing PDN connection of the UE from the WLAN access network to the LTE access network in response to the UE attaching to the LTE access network or entering the LTE normal mode.

7. The method of claim 2, wherein the triggering event comprises:
   receiving an application request at the UE to establish a new data connection supported by only WWAN access networks.

8. The method of claim 7, further comprising:
   switching to camping on an evolved packet core (EPC)-capable non-LTE WWAN access network instead of the LTE access network while refraining from transmitting and receiving data over WWAN PDN connections;
   establishing a new PDN connection at the EPC-capable non-LTE WWAN access network in response to the triggering event;
   performing, in response to the triggering event, at least one of: enabling LTE functionality or placing the UE in an LTE normal mode; and
   transferring the new PDN connection of the UE from the EPC-capable non-LTE WWAN access network to an LTE access network in response to the UE attaching to the LTE access network or entering the LTE normal mode.

9. The method of claim 7, further comprising:
   determining that the UE is camped on an LTE access network in a limited service mode while refraining from transmitting and receiving data over WWAN PDN connections;
   placing the UE in an LTE normal mode in response to the triggering event; and
   establishing a new PDN connection at the LTE access network in response to the UE entering the LTE normal mode.

10. The method of claim 7, further comprising:
    performing, in response to the triggering event, at least one of: enabling LTE functionality at the UE or placing the UE in an LTE normal mode; and establishing a new PDN connection over an LTE access network in response to the UE attaching to the LTE access network within a threshold amount of time.

11. The method of claim 10, further comprising:
returning a failure to an application that made the application request in response to a determination that the UE has not attached to the LTE access network within the threshold amount of time; and
performing, in response to the determination that the UE has not attached to the LTE access network within the threshold amount of time, at least one of: disabling LTE functionality or placing the UE in the LTE limited service mode.

12. The method of claim 2, wherein the triggering event comprises:
an application request to establish a new PDN connection for which WWAN has a higher priority than WLAN.

13. The method of claim 12, further comprising:
switching to camping on an evolved packet core (EPC)-capable non-LTE WWAN access network instead of the LTE access network while refraining from transmitting and receiving data over WWAN PDN connections;
establishing the new PDN connection at the EPC-capable non-LTE WWAN access network in response to the triggering event;
performing, in response to the triggering event, at least one of: enabling LTE functionality or placing the UE in an LTE normal mode; and
transferring the new PDN connection of the UE from the EPC-capable non-LTE WWAN access network to an LTE access network in response to the UE attaching to the LTE access network or entering the LTE normal mode.

14. The method of claim 12, further comprising:
determining that the UE is camped on an LTE access network in a limited service mode while refraining from transmitting and receiving data over WWAN PDN connections;
placing the UE in an LTE normal mode in response to the triggering event; and
establishing the new PDN connection at the LTE access network in response to the UE entering the LTE normal mode.

15. The method of claim 12, further comprising:
performing, in response to the triggering event, at least one of: enabling LTE functionality or placing the UE in an LTE normal mode;
establishing the new PDN connection at the WLAN access network in response to the triggering event; and
transferring the new PDN connection of the UE from the WLAN access network to an LTE access network in response to the UE attaching to the LTE access network.

16. A user equipment (UE), comprising:
means for determining that all traffic of all packet data network (PDN) connections of the UE is currently offloaded to a Wireless Local Area Network (WLAN) access network;
means for refraining from transmitting and receiving data over Wireless Wide Area Network (WWAN) PDN connections while all traffic of all PDN connections of the UE is offloaded to the WLAN access network;
means for determining that an only WWAN access network currently available to the UE is an LTE access network;
means for camping, based on the determining that the only WWAN access network currently available in the LTE access network, on the LTE access network and receiving system information block messages from the LTE access network while refraining from transmitting and receiving data over the WWAN PDN connections;
means for detecting a triggering event; and
means for establishing a PDN connection with at least one of an available WWAN access network or the WLAN access network in response to the triggering event according to a current WWAN camping status of the UE and a WLAN offload policy.

17. The UE of claim 16, further comprising:
means for placing the UE in a Long Term Evolution (LTE) limited service mode or disabling LTE functionality at the UE.

18. An apparatus for wireless communication, comprising:
at least one processor configured to:
determine that all traffic of all packet data network (PDN) connections of the UE is currently offloaded to a Wireless Local Area Network (WLAN) access network;
refrain from transmitting and receiving data over Wireless Wide Area Network (WWAN) PDN connections while all traffic of all PDN connections of the UE is offloaded to the WLAN access network;
determine that an only WWAN access network currently available to the UE is an LTE access network;
camp, based on the determination that the only WWAN access network currently available in the LTE access network, on the LTE access network and receiving system information block messages from the LTE access network while refraining from transmitting and receiving data over the WWAN PDN connections;
detect a triggering event; and
establish a PDN connection with at least one of an available WWAN access network or the WLAN access network in response to the triggering event according to a current WWAN camping status of the UE and a WLAN offload policy.

19. The apparatus of claim 18, wherein the refraining from transmitting and receiving data over WWAN PDN connections comprises at least one of placing the UE in a Long Term Evolution (LTE) limited service mode or disabling LTE functionality at the UE.

20. The apparatus of claim 19, wherein the at least one processor is further configured to:
identify an LTE access network available to the UE and a non-LTE WWAN access network available to the UE; and
switch to camping on the non-LTE WWAN access network instead of the LTE access network while refraining from transmitting and receiving data over WWAN PDN connections.

21. The apparatus of claim 19, wherein the triggering event comprises:
determining to transfer an existing PDN connection from the WLAN access network to the available WWAN access network.

22. The apparatus of claim 21, wherein the at least one processor is further configured to:
switch to camping on an evolved packet core (EPC)-capable non-LTE WWAN access network instead of the LTE access network while refraining from transmitting and receiving data over WWAN PDN connections;
transfer the existing PDN connection of the UE to the EPC-capable non-LTE WWAN access network in response to the triggering event;

perform, in response to the triggering event, at least one of: enabling LTE functionality or placing the UE in an LTE normal mode; and transfer the existing PDN connection of the UE from the EPC-capable non-LTE WWAN access network to an LTE access network in response to the UE attaching to the LTE access network or entering the LTE normal mode.

23. The apparatus of claim 21, wherein the at least one processor is further configured to:

determine that the UE is camped on an LTE access network in a limited service mode while refraining from transmitting and receiving data over WWAN PDN connections or that the UE has disabled LTE functionality and is not camping on any WWAN access network while refraining from transmitting and receiving data over WWAN PDN connections;

perform, in response to the triggering event, at least one of: enabling LTE functionality or placing the UE in an LTE normal mode; and transfer the existing PDN connection of the UE from the WLAN access network to the LTE access network in response to the UE attaching to the LTE access network or entering the LTE normal mode.

24. The apparatus of claim 19, wherein the triggering event comprises:

receive an application request at the UE to establish a new data connection supported by only WWAN access networks.

25. The apparatus of claim 24 wherein the at least one processor is further configured to:

switch to camping on an evolved packet core (EPC)-capable non-LTE WWAN access network instead of the LTE access network while refraining from transmitting and receiving data over WWAN PDN connections;

establish a new PDN connection at the EPC-capable non-LTE WWAN access network in response to the triggering event;

perform, in response to the triggering event, at least one of: enabling LTE functionality or placing the UE in an LTE normal mode; and transfer the new PDN connection of the UE from the EPC-capable non-LTE WWAN access network to an LTE access network in response to the UE attaching to the LTE access network or entering the LTE normal mode.

26. The apparatus of claim 24 wherein the at least one processor is further configured to:

determine that the UE is camped on an LTE access network in a limited service mode while refraining from transmitting and receiving data over WWAN PDN connections;

place the UE in an LTE normal mode in response to the triggering event; and establish a new PDN connection at the LTE access network in response to the UE entering the LTE normal mode.

27. The apparatus of claim 24 wherein the at least one processor is further configured to:

perform, in response to the triggering event, at least one of: enabling LTE functionality at the UE or placing the UE in an LTE normal mode; and establish a new PDN connection over an LTE access network in response to the UE attaching to the LTE access network within a threshold amount of time.

28. A computer program product, comprising:

a non-transitory computer-readable medium comprising computer-readable program code stored thereon, the computer-readable program code comprising:

computer-readable program code configured to cause at least one processor to determine that all traffic of all packet data network (PDN) connections of the UE is currently offloaded to a Wireless Local Area Network (WLAN) access network;

computer-readable program code configured to cause the at least one processor to refrain from transmitting and receiving data over Wireless Wide Area Network (WWAN) PDN connections while all traffic of all PDN connections of the UE is offloaded to the WLAN access network;

computer-readable program code configured to cause the at least one processor to determine that an only WWAN access network currently available to the UE is an LTE access network;

computer-readable program code configured to cause the at least one processor to camp, based on the determination that the only WWAN access network currently available in the LTE access network, on the LTE access network and receiving system information block messages from the LTE access network while refraining from transmitting and receiving data over the WWAN PDN connections;

computer-readable program code configured to cause the at least one processor to detecting a triggering event; and computer-readable program code configured to cause the at least one processor to establish a PDN connection with at least one of an available WWAN access network or the WLAN access network in response to the triggering event according to a current WWAN camping status of the UE and a WLAN offload policy.

* * * * *